(12) United States Patent
Ou et al.

(10) Patent No.: US 12,385,567 B2
(45) Date of Patent: *Aug. 12, 2025

(54) SLIDING COMPONENT

(71) Applicant: Eagle Industry Co., Ltd., Tokyo (JP)

(72) Inventors: Iwa Ou, Tokyo (JP); Tadatsugu Imura, Tokyo (JP); Hiroshi Suzuki, Tokyo (JP); Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,527

(22) Filed: Jul. 2, 2024

(65) Prior Publication Data

US 2025/0003496 A1   Jan. 2, 2025

Related U.S. Application Data

(62) Division of application No. 17/425,679, filed as application No. PCT/JP2020/003646 on Jan. 31, 2020, now Pat. No. 12,049,962.

(30) Foreign Application Priority Data

Feb. 4, 2019   (JP) ................................. 2019-017874

(51) Int. Cl.
   *F16J 15/34*   (2006.01)
   *F16J 15/3256*   (2016.01)
(52) U.S. Cl.
   CPC ....... *F16J 15/3412* (2013.01); *F16J 15/3256* (2013.01)

(58) Field of Classification Search
   CPC .......................... F16J 15/3412; F16J 15/3256
   See application file for complete search history.

(56) References Cited

U.S. PATENT DOCUMENTS

| 3,804,424 A | 4/1974 | Gerdner | F16J 15/34 |
| 4,889,348 A | 12/1989 | Amundson et al. | F16J 15/34 |
| 5,092,612 A | 3/1992 | Victor et al. | F16J 15/34 |

(Continued)

FOREIGN PATENT DOCUMENTS

| CH | 677266 | 10/1987 | F16J 15/34 |
| CN | 1100503 | 3/1995 | F16J 15/16 |

(Continued)

OTHER PUBLICATIONS

U.S. Appl. No. 17/425,679, filed Jul. 23, 2024.

(Continued)

*Primary Examiner* — Vishal A Patel
(74) *Attorney, Agent, or Firm* — HAYES SOLOWAY P.C.

(57) ABSTRACT

A sliding component having an annular shape is disposed in a place where relative rotation is performed in a rotary machine, in which a plurality of dynamic pressure generating mechanisms are provided in a sliding surface of the sliding component, each including a deep groove portion that communicates with an outer diameter side, and at least one shallow groove portion that communicates with the deep groove portion and extends in a circumferential direction, and the deep groove portion is provided with a trap portion that suppresses a sealed liquid in the deep groove portion from leaking to a leakage side.

20 Claims, 17 Drawing Sheets

(56) References Cited

U.S. PATENT DOCUMENTS

| | | | |
|---|---|---|---|
| 5,180,173 A | 1/1993 | Kimura et al. | F16J 15/34 |
| 5,441,283 A | 8/1995 | Pecht et al. | F16J 15/34 |
| 5,492,341 A | 2/1996 | Pecht et al. | F16J 15/34 |
| 6,189,896 B1 | 2/2001 | Dickey | F16C 17/045 |
| 7,044,470 B2 | 5/2006 | Zheng | F16J 15/342 |
| 9,039,013 B2 | 5/2015 | Artiles | F16J 15/3412 |
| 9,151,390 B2 | 10/2015 | Hosoe et al. | |
| 9,353,867 B2 | 5/2016 | Itadani et al. | F16J 15/3448 |
| 9,371,912 B2 | 6/2016 | Hosoe et al. | F16J 15/34 |
| 9,512,923 B2 | 12/2016 | Inoue et al. | F16J 16/34 |
| 9,677,670 B2 | 6/2017 | Itadani et al. | F16J 15/3412 |
| 9,765,892 B2 | 9/2017 | Itadani et al. | F16J 15/34 |
| 9,772,037 B2 | 9/2017 | Itadani et al. | F16J 15/3412 |
| 9,822,882 B2* | 11/2017 | Kamemura | F16J 15/3204 |
| 9,829,109 B2 | 11/2017 | Itadani et al. | F16J 15/40 |
| 9,841,106 B2 | 12/2017 | Itadani et al. | F16J 15/34 |
| 9,845,886 B2 | 12/2017 | Itadani | |
| 9,850,953 B2 | 12/2017 | Tokunaga | F16J 33/741 |
| 10,054,230 B2 | 8/2018 | Katori | F16J 15/34 |
| 10,337,560 B2 | 7/2019 | Tokunaga et al. | F16J 15/40 |
| 10,473,220 B2 | 11/2019 | Tokunaga et al. | F16J 15/40 |
| 10,704,417 B2 | 7/2020 | Tokunaga et al. | F01D 25/16 |
| 11,603,934 B2 | 3/2023 | Imura | F16J 15/34 |
| 12,049,962 B2* | 7/2024 | Ou | F16J 15/3256 |
| 2002/0079648 A1 | 6/2002 | Uth | F16J 15/34 |
| 2010/0038862 A1 | 2/2010 | Young | B23K 26/352 |
| 2012/0018957 A1 | 1/2012 | Watanbe | F16J 15/34 |
| 2012/0280458 A1 | 11/2012 | Artiles et al. | F16J 15/44 |
| 2014/0197600 A1 | 7/2014 | Hosoe et al. | F16J 16/40 |
| 2014/0217676 A1 | 8/2014 | Hosoe et al. | F16J 15/34 |
| 2015/0097341 A1 | 4/2015 | Inoue et al. | F16J 15/3424 |
| 2015/0115537 A1 | 4/2015 | Tokunaga | F16J 15/34 |
| 2015/0123350 A1 | 5/2015 | Itadani et al. | F16J 15/3412 |
| 2015/0184752 A1 | 7/2015 | Itadani | F16J 15/3412 |
| 2015/0226334 A1 | 8/2015 | Itadani | F16J 15/3412 |
| 2015/0260292 A1 | 9/2015 | Inoue | F16J 15/342 |
| 2016/0033045 A1 | 2/2016 | Itadani et al. | F16J 15/3412 |
| 2017/0350407 A1 | 12/2017 | Yamamoto et al. | F04D 29/046 |
| 2018/0073394 A1 | 3/2018 | Tokunaga et al. | F16D 25/18 |
| 2018/0128377 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0299015 A1 | 10/2018 | Itadani | F16J 15/3448 |
| 2019/0285115 A1 | 9/2019 | Negishi et al. | F16C 17/04 |
| 2019/0301522 A1 | 10/2019 | Negishi et al. | F16C 17/026 |
| 2023/0167905 A1 | 6/2023 | Negishi | F16J 15/3416 |

FOREIGN PATENT DOCUMENTS

| | | | |
|---|---|---|---|
| CN | 1364987 | 8/2002 | F16J 15/40 |
| CN | 101469771 | 7/2009 | F16J 15/40 |
| CN | 102483162 | 5/2012 | F16J 15/18 |
| CN | 103104707 | 5/2013 | F16J 15/16 |
| CN | 103122998 | 5/2013 | F16J 15/16 |
| CN | 103216626 | 7/2013 | F16J 15/40 |
| CN | 103732958 | 4/2014 | F16J 15/34 |
| CN | 103765060 | 4/2014 | F16J 15/34 |
| CN | 104169622 | 11/2014 | F16J 15/34 |
| CN | 104334939 | 2/2015 | F16J 15/34 |
| CN | 104919229 | 9/2015 | F16J 15/34 |
| CN | 105793628 | 7/2016 | F16J 15/34 |
| CN | 106015571 | 10/2016 | F16J 15/16 |
| CN | 106104112 | 11/2016 | F16J 15/35 |
| CN | 106352093 | 1/2017 | F16J 15/34 |
| CN | 106763778 | 5/2017 | F16J 15/16 |
| CN | 107407424 | 11/2017 | F16J 15/34 |
| CN | 107532725 | 1/2018 | F16J 15/34 |
| CN | 107735604 | 2/2018 | F16J 15/34 |
| DE | 2444544 | 9/1974 | F16J 15/34 |
| DE | 69113539 | 1/1992 | F16J 15/34 |
| DE | 102008038396 | 2/2010 | F16J 15/34 |
| EP | 2977654 | 1/2016 | F16J 15/34 |
| EP | 3091258 | 11/2016 | F16J 15/34 |
| EP | 3543569 | 9/2019 | F16J 15/34 |
| FR | 2342440 | 9/1977 | F16J 15/34 |
| JP | 50-45155 | 4/1975 | F16J 15/34 |
| JP | 56-15856 | 2/1981 | F16J 15/34 |
| JP | 4-50559 | 2/1992 | F16J 15/34 |
| JP | 5-164249 | 6/1993 | F16J 15/34 |
| JP | 6-174107 | 6/1994 | F16J 15/34 |
| JP | 7-71618 | 3/1995 | F16J 15/34 |
| JP | 8-502809 | 3/1996 | F16J 15/34 |
| JP | 8-303606 | 11/1996 | F16J 15/34 |
| JP | 3079562 | 6/2000 | F16J 15/34 |
| JP | 2002-286026 | 10/2002 | F16J 15/34 |
| JP | 2011-74931 | 4/2011 | F16J 15/34 |
| JP | 2012-2295 | 1/2012 | F16J 15/34 |
| JP | 2012-159152 | 8/2012 | F16J 15/34 |
| JP | 2017-141962 | 8/2017 | F16J 15/34 |
| JP | 2018-200068 | 12/2018 | F16J 15/34 |
| WO | WO9506212 | 3/1995 | F16J 15/34 |
| WO | WO2012046749 | 4/2012 | F16C 17/04 |
| WO | WO2013035502 | 3/2013 | F16J 15/34 |
| WO | WO2013035503 | 3/2013 | F16J 15/34 |
| WO | WO2013176009 | 11/2013 | F16J 15/34 |
| WO | WO2014024742 | 2/2014 | F16J 15/34 |
| WO | WO2014148317 | 9/2014 | F16J 15/34 |
| WO | WO2015199171 | 12/2015 | F16J 15/34 |
| WO | WO2015199172 | 12/2015 | F16J 15/34 |
| WO | WO2016167262 | 10/2016 | F16J 15/34 |
| WO | WO2016186015 | 11/2016 | F16J 15/34 |
| WO | WO2016186019 | 11/2016 | F16J 15/08 |
| WO | WO2016203878 | 12/2016 | F16J 15/34 |
| WO | WO2017061406 | 4/2017 | F16J 15/34 |
| WO | WO2018092742 | 5/2018 | F16J 15/34 |
| WO | WO2018105505 | 6/2018 | F16C 33/12 |
| WO | WO2019139107 | 7/2019 | F16J 15/34 |

OTHER PUBLICATIONS

U.S. Appl. No. 16/640,324, filed Feb. 19, 2020, Sasaki et al.
U.S. Appl. No. 17/428,262, filed Aug. 3, 2021, Imura et al.
U.S. Appl. No. 17/428,912, filed Aug. 5, 2021, Ou et al.
U.S. Appl. No. 17/425,679, filed Jul. 23, 2021, Ou et al.

* cited by examiner

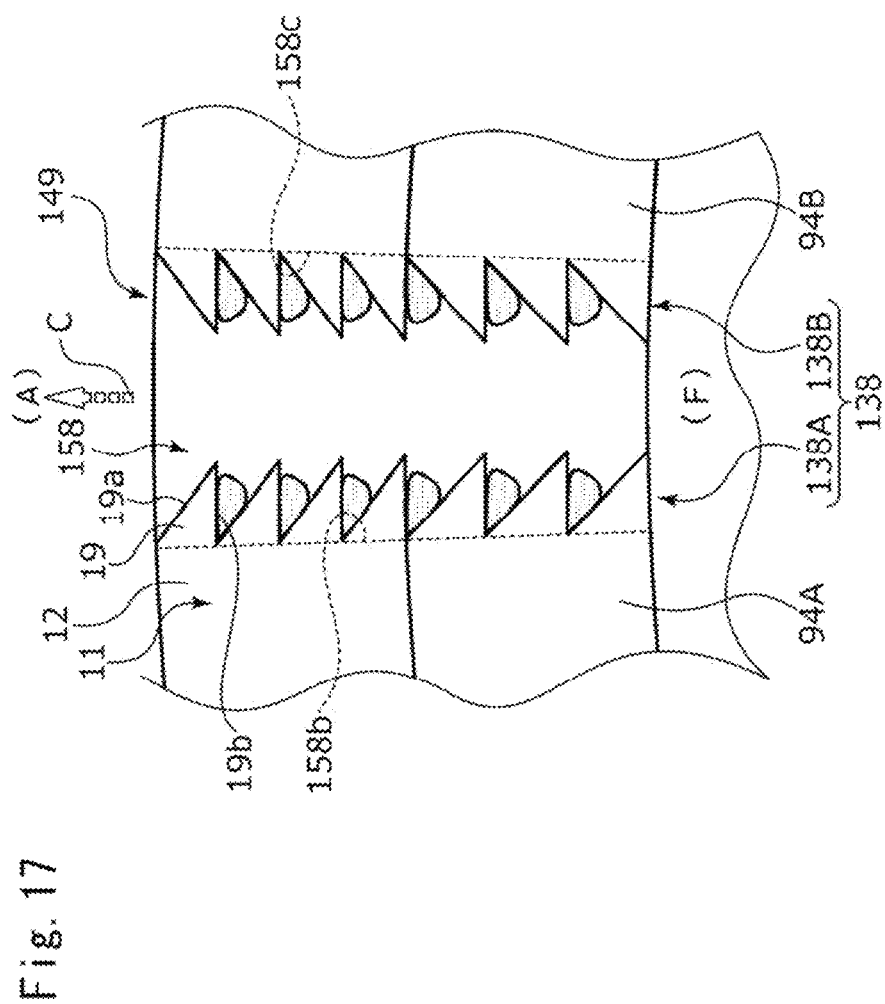

SLIDING COMPONENT

CROSS REFERENCE TO RELATED APPLICATIONS

The present application is a divisional of U.S. patent application Ser. No. 17/425,679, filed Jul. 23, 2021, which is a 371 National Phase filing of PCT/JP2020/003646, filed Jan. 31, 2020, which claims benefit to Japanese Patent Application Serial No. 2019-017874, filed Feb. 4, 2019, the contents of which are incorporated herein by reference.

TECHNICAL FIELD

The present invention relates to a sliding component that is subjected to relative rotation, for example, a sliding component used in a seal device that seals a rotating shaft of a rotary machine in an automobile, a general industrial machine, or other sealing fields, or a sliding component used in a bearing of an automobile, a general industrial machine, or a machine in other bearing fields.

BACKGROUND ART

As a seal device that prevents leakage of a sealed liquid, for example, there is a mechanical seal including a pair of sliding components which have an annular shape and rotate relative to each other to cause sliding surfaces to slide against each other. In such a mechanical seal, in recent years, there has been a desire that energy lost by sliding is reduced for environmental measures, and the sliding surface of the sliding component is provided with a positive pressure generating groove communicating with an outer diameter side which is a sealed liquid side of a high pressure, and having a closed one end in the sliding surface. Accordingly, when the sliding components rotate relative to each other, a positive pressure is generated in the positive pressure generating groove to separate the sliding surfaces from each other, and the sealed liquid is introduced into the positive pressure generating groove from the outer diameter side to be held therein. Therefore, the lubricity is improved, and the friction is reduced.

Further, in order to maintain sealability for a long period of time, the mechanical seal is required to satisfy a condition such as "sealing" in addition to "lubrication". For example, in a mechanical seal described in Patent Citation 1, one sliding component is provided with a Rayleigh step and a reverse Rayleigh step that communicate with a sealed liquid side. Accordingly, when sliding components rotate relative to each other, a positive pressure is generated between sliding surfaces by the Rayleigh step, to separate the sliding surfaces from each other, and the Rayleigh step holds a sealed liquid. Therefore, the lubricity is improved. Meanwhile, since a relatively negative pressure is generated in the reverse Rayleigh step, and the reverse Rayleigh step is disposed closer to a leakage side than the Rayleigh step, the sealed liquid of a high pressure which has flowed out from the Rayleigh step to a gap between the sliding surfaces can be suctioned into the reverse Rayleigh step. In such a manner, the sealed liquid between a pair of the sliding components is prevented from leaking to the leakage side, so that the sealability is improved.

CITATION LIST

Patent Literature

Patent Citation 1: WO 2012/046749 A (pages 14 to 16 and FIG. 1)

SUMMARY OF INVENTION

Technical Problem

However, in Patent Citation 1, since a structure where the reverse Rayleigh step causes the sealed liquid to return to the sealed liquid side is adopted, the sealed liquid is not supplied to the leakage side in the gap between the sliding surfaces, and there is a portion which has no contribution to lubricity, which is a problem. Therefore, sliding components having higher lubricity are required. In addition, the sealed liquid easily leaks from an opening portion of the reverse Rayleigh step, so that the lubricity becomes poorer, which is a problem.

The present invention has been made in view of such a problem, and an object of the present invention is to provide a sliding component that supplies a sealed fluid to a leakage side in a gap between sliding surfaces to exhibit high lubricity and has a small leakage of the sealed fluid.

Solution to Problem

In order to solve the above problem, according to the present invention, there is provided a sliding component that has an annular shape and is disposed in a place where relative rotation is performed in a rotary machine, including a plurality of dynamic pressure generating mechanisms, in which a plurality of dynamic pressure generating mechanisms are provided in a sliding surface of the sliding component, each of the dynamic pressure generating mechanisms including a deep groove portion that communicates with an outer diameter side or an inner diameter side, and at least one shallow groove portion that communicates with the deep groove portion and extends in a circumferential direction, the shallow groove portion is shallower than the deep groove portion, and the deep groove portion is provided with a trap portion that suppresses leakage of a sealed fluid in the deep groove portion. According to the aforesaid features of the present invention, the deep groove portion has a deep groove depth and a large volume, so that a large amount of the sealed fluid supplied to the leakage side of the sliding surface can be recovered and returned to the shallow groove portion, and the lubricity can be improved by using a wide area extending to the leakage side of the sliding surface. In addition, since the deep groove portion is provided with the trap portion, the sealed fluid can be easily held in the deep groove portion. Therefore, the sealed fluid can be suppressed from leaking from the deep groove portion.

It may be preferable that the deep groove portion communicates with the outer diameter side. According to this preferable configuration, the deep groove portion communicating with the outer diameter side is provided with the trap portion, so that the sealed fluid is held in the deep groove portion against centrifugal force that is generated in the sealed fluid due to relative rotation of the sliding component. Therefore, the sealed fluid can be suppressed from leaking from inside the deep groove portion to the outer diameter side.

It may be preferable that the deep groove portion communicates with a leakage side. According to this preferable configuration, the deep groove portion communicating with the leakage side is provided with the trap portion, so that the sealed fluid can be suppressed from leaking to the leakage side. Further, in a case where the deep groove portion communicates with the outer diameter side, since the sealed fluid is held in the deep groove portion against the centrifugal force, which is generated in the sealed fluid due to relative rotation of the sliding component, and a leakage direction of the sealed fluid, the sealed fluid can be further suppressed from leaking from the deep groove portion to the leakage side located on the outer diameter side.

It may be preferable that the trap portion is a trap piece extending from an inner surface of the deep groove portion. According to this preferable configuration, the trap piece extends from the inner surface of the deep groove portion, so that the trap portion having high rigidity can be easily formed.

It may be preferable that the trap portion includes a guide surface that guides the sealed fluid toward the shallow groove portion. According to this preferable configuration, the sealed fluid held in the deep groove portion by the trap piece can be guided to the shallow groove portion along the guide surface.

It may be preferable that the trap portion is disposed at least in a place near an opening portion of the deep groove portion communicating with the leakage side. According to this preferable configuration, the amount of the sealed fluid held in the deep groove portion can be secured.

It may be preferable that the trap portion is disposed at least in a place where the deep groove portion intersects the shallow groove portion. According to this preferable configuration, the sealed fluid moving from the deep groove portion to the shallow groove portion is held, so that dynamic pressure can be reliably generated.

It may be preferable that the trap portion is axisymmetrically disposed with respect to a center line of the deep groove portion, the center line extending in a radial direction. According to this preferable configuration, the function of holding the sealed fluid can be exhibited to correspond to the sliding component rotating to both sides in the circumferential direction.

It may be preferable that the trap portion is integrally molded with a base material forming the sliding surface. According to this preferable configuration, the trap portion can be easily molded.

It may be preferable that the trap portion defines a meandering groove that meanders in the deep groove portion. According to this preferable configuration, the function of holding the sealed fluid can be improved by the meandering groove.

Incidentally, the fact that the shallow groove portion of the sliding component according to the present invention extends in the circumferential direction means that the shallow groove portion may extend with at least a component in the circumferential direction, preferably, may extend such that the component along the circumferential direction is larger than the component in the radial direction. In addition, the fact that the deep groove portion extends in the radial direction means that the deep groove portion may extend with at least a component in the radial direction, preferably, may extend such that the component along the radial direction is larger than the component in the circumferential direction.

In addition, the sealed fluid may be a liquid, or have a mist form in which a liquid and a gas are mixed.

BRIEF DESCRIPTION OF DRAWINGS

FIG. 17 is a main part enlarged view of a sliding surface of a stationary seal ring as a sliding component according to an eleventh embodiment of the present invention.

DESCRIPTION OF EMBODIMENTS

Figure 1:
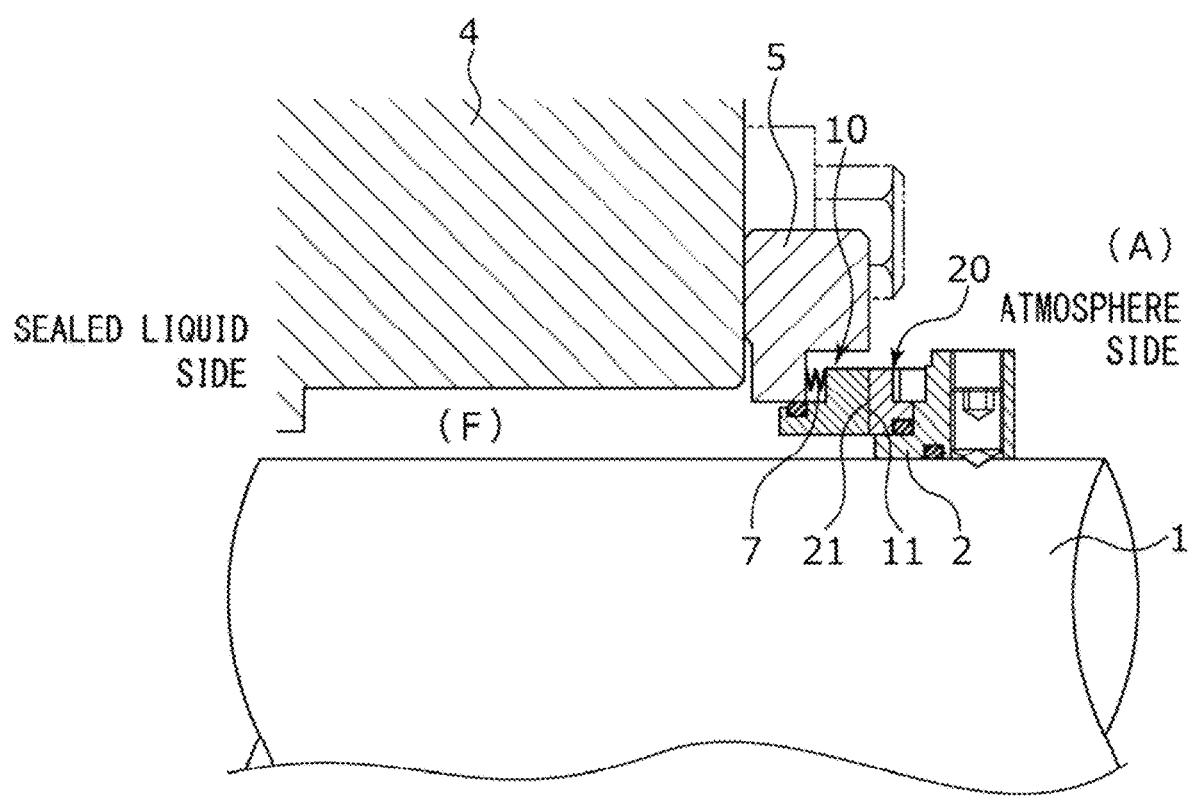
FIG. 1 is a longitudinal cross-sectional view illustrating one example of a mechanical seal including a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 6. Incidentally, in the present embodiment, a mode in which the sliding component is a mechanical seal will be described as an example. In addition, a description will be given based on the premise that an inner diameter side of the sliding component forming the mechanical seal is a sealed liquid side (i.e., high-pressure side) as a sealed fluid side and an outer diameter side is an atmosphere side (i.e., low-pressure side) as a leakage side. In addition, for convenience of description, in the drawings, dots may be added to a groove and the like formed in a sliding surface.

A mechanical seal for a general industrial machine illustrated in FIG. 1 is an outside mechanical seal that seals a sealed liquid F which tends to leak from an inner diameter side of sliding surfaces toward an outer diameter side, and mainly includes a rotating seal ring 20 which is a sliding component that has an annular shape and is provided on a rotating shaft 1 with a sleeve 2 interposed therebetween, to be rotatable together with the rotating shaft 1, and a stationary seal ring 10 that has an annular shape and is a sliding component which is provided on a seal cover 5 fixed to a housing 4 of a mounted apparatus, to not be rotated but be movable in an axial direction. The stationary seal ring 10 is biased in the axial direction by a bellows 7, so that a sliding surface 11 of the stationary seal ring 10 and a sliding surface 21 of the rotating seal ring 20 slide against each other in close contact with each other. Incidentally, the sliding surface 21 of the rotating seal ring 20 is a flat surface, and a recessed portion is not provided in the flat surface.

The stationary seal ring 10 and the rotating seal ring 20 are representatively made of SiC (as an example of hard material) or a combination of SiC (as the example of hard material) and carbon (as an example of soft material); the sliding material is not limited thereto, and any type of sliding material is applicable as long as the sliding material is used as a sliding material for a mechanical seal. Incidentally, as the SiC, there are materials consisting of different components and compositions of two or more phases including a sintered body in which boron, aluminum, carbon, or the like is used as a sintering additive, for example, reaction-sintered SiC, SiC—TiC, SiC—TiN, and the like consisting of Sic or SiC and Si in which graphite particles are dispersed. As the carbon, resin molded carbon, sintered carbon, and the like carbon including carbon in which a carbonaceous material and a graphite material are mixed can be used. In addition, in addition to the above sliding materials, metallic materials, resin materials, surface modifiers (e.g., coating materials), composite materials, or the like are also applicable.

Figure 2:
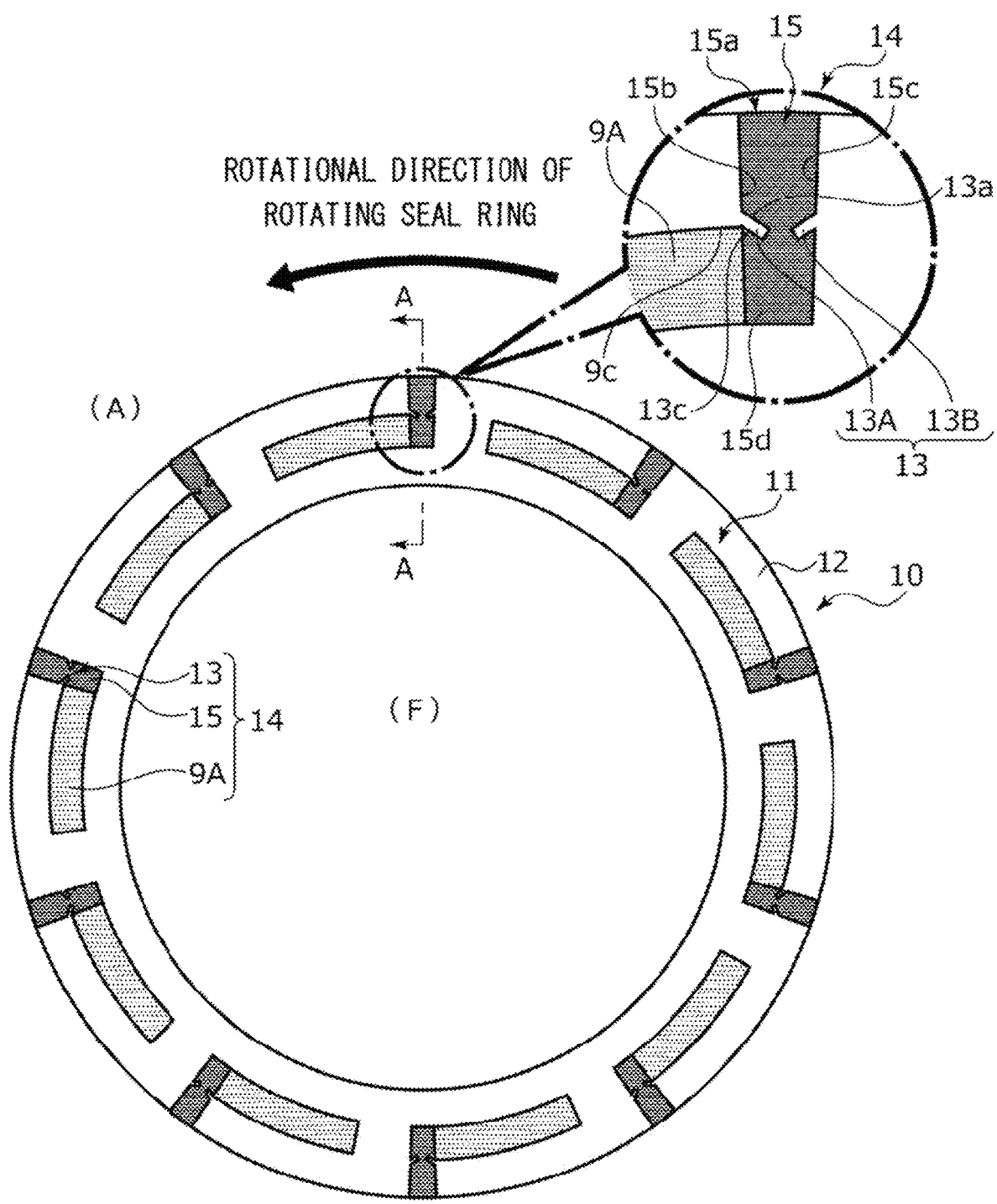
FIG. 2 is a view of a sliding surface of a stationary seal ring when seen in an axial direction in the first embodiment.

As illustrated in FIG. 2, the rotating seal ring 20 slides relative to the stationary seal ring 10 as indicated by an arrow, and a plurality of dynamic pressure generating mechanisms 14 which are integrally molded with a base material forming the sliding surface 11 are evenly provided in the sliding surface 11 of the stationary seal ring 10 in a circumferential direction of the stationary seal ring 10. A portion of the sliding surface 11 other than the dynamic pressure generating mechanisms 14 is a land 12 forming a flat surface.

Figure 3:
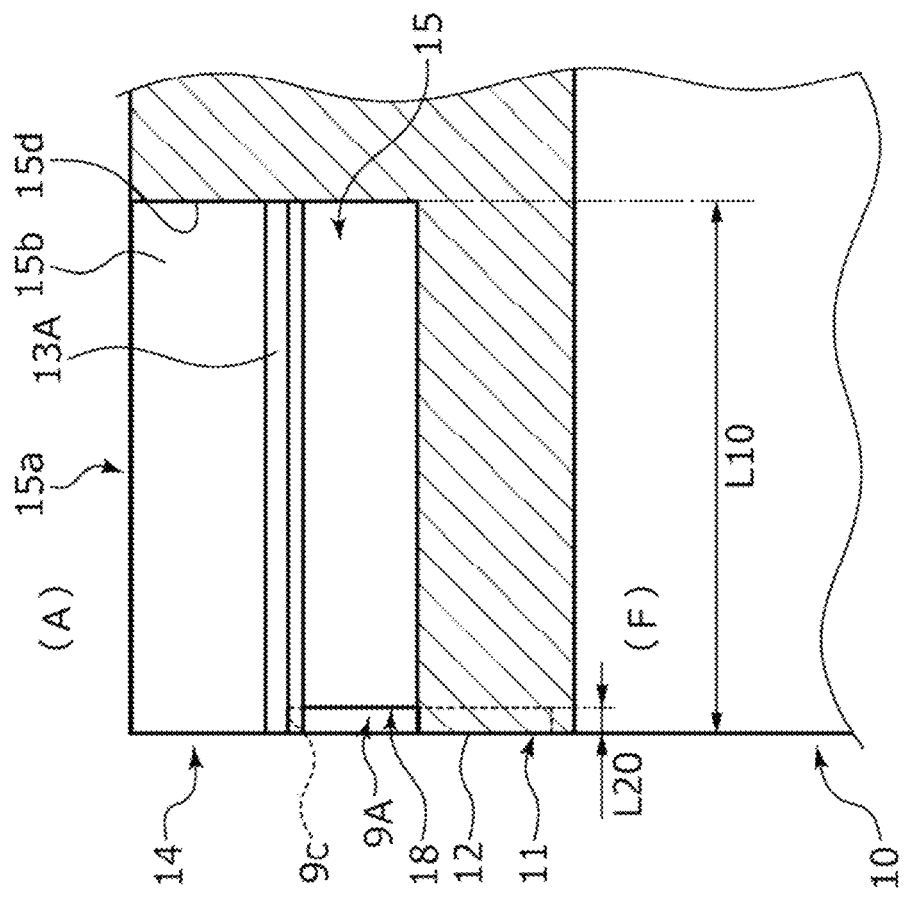
FIG. 3 is an A-A cross-sectional view of FIG. 2.
Figure 4:
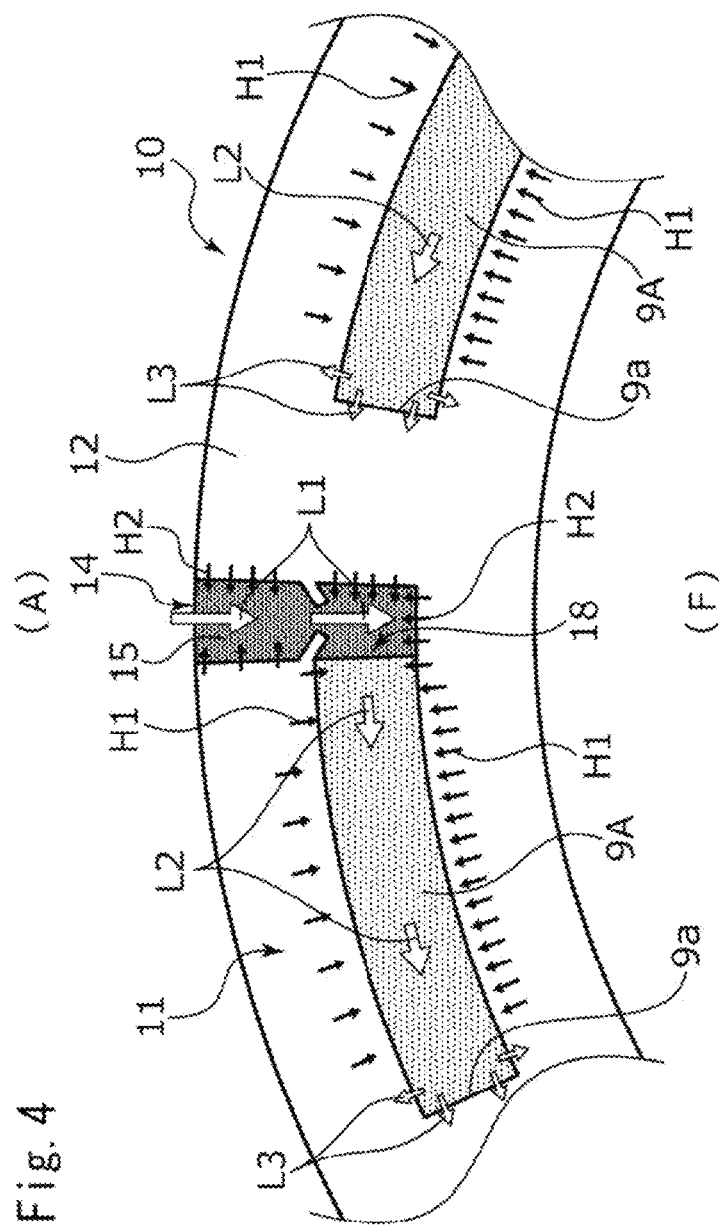
FIG. 4 is a partial enlarged view of the sliding surface of the stationary seal ring in the first embodiment.
Figure 5:
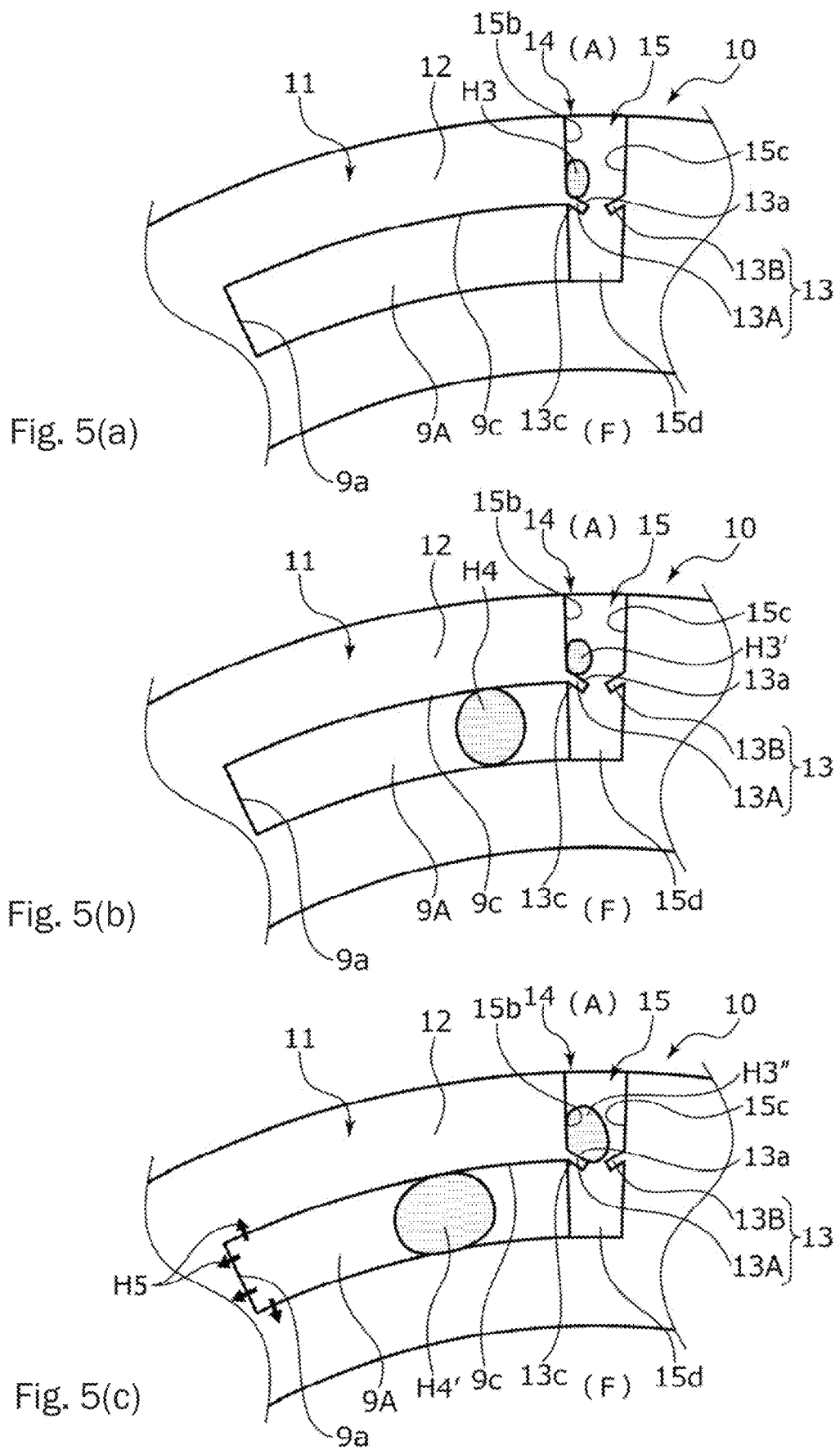
FIGS. 5A, 5B, and 5C are schematic views describing an operation in which a sealed liquid which is suctioned from an inner diameter side of a liquid guide groove portion at an initial stage of relative rotation flows out to a gap between sliding surfaces in the first embodiment.

Next, an outline of the dynamic pressure generating mechanism 14 will be described based on FIGS. 2 to 4. Incidentally, hereinafter, a description will be given based on the premise that when the stationary seal ring 10 and the rotating seal ring 20 rotate relative to each other, the left side of the drawing sheet of FIG. 4 is a downstream side of the sealed liquid F flowing in a Rayleigh step 9A to be described later, and the right side of the drawing sheet of FIG. 4 is an upstream side of the sealed liquid F flowing in the Rayleigh step 9A.

The dynamic pressure generating mechanism 14 includes a liquid guide groove portion 15 as a deep groove portion that communicates with the atmosphere side and extends in an inner diameter direction, the Rayleigh step 9A as a shallow groove portion that extends concentrically with the stationary seal ring 10 from an inner diameter side end portion of the liquid guide groove portion 15 toward the downstream side in the circumferential direction, and a trap portion 13 that gradually narrows the width of a flow path of the liquid guide groove portion 15 as the flow path extends from the outer diameter side toward the inner diameter side. Namely, the dynamic pressure generating mechanism 14 has an inverted L shape formed by the liquid guide groove portion 15 and the Rayleigh step 9A, when seen in a direction orthogonal to the sliding surface 11. Incidentally, the liquid guide groove portion 15 of the first embodiment extends in a radial direction to be orthogonal to an axis of the stationary seal ring 10. In addition, the liquid guide groove portion 15 and the Rayleigh step 9A communicate with each other, and a step 18 in a depth direction is formed in a communication portion.

In addition, a wall portion 9a orthogonal to a rotational direction is formed in an end portion on the downstream side of the Rayleigh step 9A. Incidentally, the wall portion 9a is not limited to being orthogonal to the rotational direction, for example, may be inclined with respect to the rotational direction or may be formed in a step shape.

The liquid guide groove portion 15 includes an opening portion 15a that is open to an outer periphery of the stationary seal ring 10 to communicate with the atmosphere side. In addition, a depth dimension L10 of the liquid guide groove portion 15 is larger than a depth dimension L20 of the Rayleigh step 9A (i.e., L10>L20). Specifically, in the first embodiment, the depth dimension L10 of the liquid guide groove portion 15 is 100 μm, and the depth dimension L20 of the Rayleigh step 9A is 5 μm. Namely, the step 18 in the depth direction is formed between the liquid guide groove portion 15 and the Rayleigh step 9A by a downstream wall surface 15b of the liquid guide groove portion 15 and a bottom surface of the Rayleigh step 9A. Incidentally, as long as the depth dimension of the liquid guide groove portion 15 is larger than the depth dimension of the Rayleigh step 9A, the depth dimensions of the liquid guide groove portion 15 and the Rayleigh step 9A can be freely changed, and it is preferable that the dimension L10 is five times or more the dimension L20.

Incidentally, the bottom surface of the Rayleigh step 9A is a flat surface and is formed in parallel to the land 12; however, the flat surface is not prevented from being provided with a fine recessed portion or being formed to be inclined with respect to the land 12. Further, each of two arc-shaped surfaces of the Rayleigh step 9A is orthogonal to the bottom surface of the Rayleigh step 9A, the two arc-shaped surfaces extending in the circumferential direction. In addition, a bottom surface 15d of the liquid guide groove portion 15 is a flat surface and is formed in parallel to the land 12; however, the flat surface is not prevented from being provided with a fine recessed portion or being formed to be inclined with respect to the land 12. Further, referring to FIG. 3, the liquid guide groove portion 15 includes the downstream wall surface 15b and an upstream wall surface 15c that extend in the radial direction and face each other in the circumferential direction, and the bottom surface 15d that is orthogonal to the wall surfaces 15b and 15c. Namely, the downstream wall surface 15b, the upstream wall surface 15c, and the bottom surface 15d form an inner surface of the liquid guide groove portion 15.

The trap portion 13 includes a trap piece 13A that extends to the inner diameter side from the downstream wall surface 15b of the liquid guide groove portion 15 toward a center side in the circumferential direction of the liquid guide groove portion 15, the downstream wall surface 15b being located on the outer diameter side of the Rayleigh step 9A, and a trap piece 13B that faces the trap piece 13A and extends to the inner diameter side from the upstream wall surface 15c of the liquid guide groove portion 15 toward the center side in the circumferential direction of the liquid guide groove portion 15. The trap pieces 13A and 13B are axisymmetrically disposed with respect to an imaginary center line of the liquid guide groove portion 15, the imaginary center line extending in the radial direction. Incidentally, in the following description, the trap piece 13A will be described unless otherwise specified, and the description of the trap piece 13B will be omitted.

The trap piece 13A is provided with a low-pressure side wall surface 13a that extends to the inner diameter side from the downstream wall surface 15b of the liquid guide groove portion 15 toward the center side in the circumferential direction of the liquid guide groove portion 15, the downstream wall surface 15b being located closer to the outer diameter side than a low-pressure side wall surface 9c extending in the circumferential direction of the Rayleigh step 9A, and a high-pressure side wall surface 13c that is continuous with the low-pressure side wall surface 9c of the Rayleigh step 9A and extends to the inner diameter side from the downstream wall surface 15b of the liquid guide groove portion 15 toward the center side in the circumferential direction of the liquid guide groove portion 15. The low-pressure side wall surface 13a and the high-pressure side wall surface 13c of the trap piece 13A are flat surfaces; however, each of the flat surfaces is not prevented from being provided with a fine recessed portion or an end surface thereof is not prevented from being rounded.

In addition, an end surface of the trap piece 13A forms the same plane as that of the land 12 and is continuous therewith, the end surface facing the sliding surface 21 of the rotating seal ring 20. In addition, the trap piece 13A is continuous from the end surface, which forms the same plane as that of the land 12 and faces the sliding surface 21 of the rotating seal ring 20, to the bottom surface 15d of the liquid guide groove portion 15.

Next, the operation during relative rotation of the stationary seal ring 10 and the rotating seal ring 20 will be described. First, during non-operation of the general industrial machine, namely, when the rotating seal ring 20 does not rotate, a slight amount of the sealed liquid F on the outer diameter side of the sliding surfaces 11 and 21 enters a gap between the sliding surfaces 11 and 21 due to the capillary phenomenon, and in the dynamic pressure generating mechanism 14, the sealed liquid F which has remained during stop of the general industrial machine and the atmosphere which has entered from the inner diameter side of the sliding surfaces 11 and 21 are mixed. Incidentally, since the sealed liquid F has a higher viscosity than a gas, the amount of leakage from the dynamic pressure generating mechanism 14 to a low-pressure side during stop of the general industrial machine is small.

In a case where almost no sealed liquid F remains in the dynamic pressure generating mechanism 14 during stop of the general industrial machine, when the rotating seal ring 20 rotates relative to the stationary seal ring 10 (refer to the black arrow of FIG. 2), as illustrated in FIG. 4, a low-pressure side fluid A on the atmosphere side is introduced from the liquid guide groove portion 15 as indicated by an arrow L1, and the Rayleigh step 9A causes the low-pressure side fluid A to move in a following manner in the rotational direction of the rotating seal ring 20 as indicated by an arrow L2, so that dynamic pressure is generated in the Rayleigh step 9A.

The pressure is the highest in the vicinity of the wall portion 9a which is the end portion on the downstream side of the Rayleigh step 9A, so that the low-pressure side fluid A flows out from the vicinity of the wall portion 9a to the periphery thereof as indicated by an arrow L3. Incidentally, the pressure decreases gradually as the upstream side of the Rayleigh step 9A is approached.

In addition, when the stationary seal ring 10 and the rotating seal ring 20 rotate relative to each other, the sealed liquid F of a high pressure flows into the gap between the sliding surfaces 11 and 21 from the inner diameter side thereof at all times to perform so-called fluid lubrication. At this time, since the pressure of the sealed liquid F in the vicinity of the Rayleigh step 9A, as described above, particularly on the downstream side of the Rayleigh step 9A is high, as indicated by an arrow H1, the sealed liquid F remains located on the land 12 to hardly enter the Rayleigh step 9A.

On the other hand, since the liquid guide groove portion 15 is a deep groove portion and communicates with the low-pressure side, as indicated by an arrow H2, the sealed liquid F in the vicinity of the liquid guide groove portion 15 easily enters the liquid guide groove portion 15. In addition, since the sealed liquid F is a liquid and has large surface tension, the sealed liquid F moves along side wall surfaces of the liquid guide groove portion 15 to easily enter the liquid guide groove portion 15.

Next, an operation in which the sealed liquid F suctioned into the liquid guide groove portion 15 flows out to the gap between the sliding surfaces 11 and 21 will be described.

In a case where almost no sealed liquid F remains in the dynamic pressure generating mechanism 14, when the rotating seal ring 20 rotates relative to the stationary seal ring 10 (refer to the black arrow of FIG. 2), as illustrated in FIG. 5A, the sealed liquid F which has infiltrated into the liquid guide groove portion 15 becomes an agglomerated droplet as indicated by reference sign H3. Thereafter, as illustrated in FIG. 5B, when the droplet reaches a certain volume, the droplet passes through the trap portion 13 due to a relatively low pressure formed upstream of the Rayleigh step 9A, as indicated by reference sign H4, to be suctioned into the Rayleigh step 9A. At the same time, the sealed liquid F newly enters the liquid guide groove portion 15 to become a droplet H3'. At this time, the sealed liquid F of a larger amount than the amount at an initial stage of the relative rotation in FIG. 5A enters the liquid guide groove portion 15.

Thereafter, as illustrated in FIG. 5C, the sealed liquid F suctioned into the Rayleigh step 9A receives a large shearing force from the rotating seal ring 20 to move to the downstream side in the Rayleigh step 9A while the pressure increases, as indicated by an arrow H5, to flow out from the vicinity of the wall portion 9a to a peripheral portion of the wall portion 9a. At the same time, a larger amount of the sealed liquid F newly enters the liquid guide groove portion 15 to become a droplet H3", and as indicated by reference sign H4', the droplet H3' is suctioned into the Rayleigh step 9A.

Thereafter, the amount of the sealed liquid F entering the liquid guide groove portion 15 is further increased than in the state illustrated in FIG. 5C, and a steady state where the sealed liquid F flows out continuously from the Rayleigh step 9A to the gap between the sliding surfaces 11 and 21 is reached. In the steady state, the sealed liquid F of a high pressure flows into the gap between the sliding surfaces 11 and 21 from the outer diameter side thereof or the Rayleigh step 9A at all times to perform fluid lubrication as described above. Incidentally, the time until the steady state is reached via the states of FIGS. 5A to 5C is a transient short time. In addition, when the sealed liquid F remains in the dynamic pressure generating mechanism 14 during stop of the general industrial machine, depending on the amount of the sealed liquid F remaining in the dynamic pressure generating mechanism 14, the operation starts from any one of the state of FIG. 5A, the state of FIG. 5B, the state of FIG. 5C, and the steady state.

Here, since the liquid guide groove portion 15 is a deep groove portion and communicates with the low-pressure side, the sealed liquid F indicated by the arrow H5 is easily suctioned into the liquid guide groove portion 15 adjacent thereto, so that the amount of the sealed liquid F between the sliding surfaces 11 and 21 is stable and high lubricity can be maintained. In addition, since a liquid has a larger interfacial tension for a solid than a gas, the sealed liquid F is easily held between the sliding surfaces 11 and 21, and the atmosphere is easily discharged to the outer diameter side of the stationary seal ring 10 and the rotating seal ring 20.

In addition, referring to FIGS. 5A, 5B and 5C, as illustrated with the droplets H3, H3', and H3", since in the trap portion 13, the low-pressure side wall surfaces 13a and 13a of the trap pieces 13A and 13B which are inclined toward the inner diameter side, which is an inflow direction of the sealed liquid F, from the wall surfaces 15b and 15c to the center side in the circumferential direction of the liquid guide groove portion 15 function as guide surfaces that guide the sealed liquid F to a Rayleigh step 9A side, even when the flow path of the liquid guide groove portion 15 is narrowed by the trap portion 13, movement of the sealed liquid F is unlikely to be interrupted.

Figure 6:
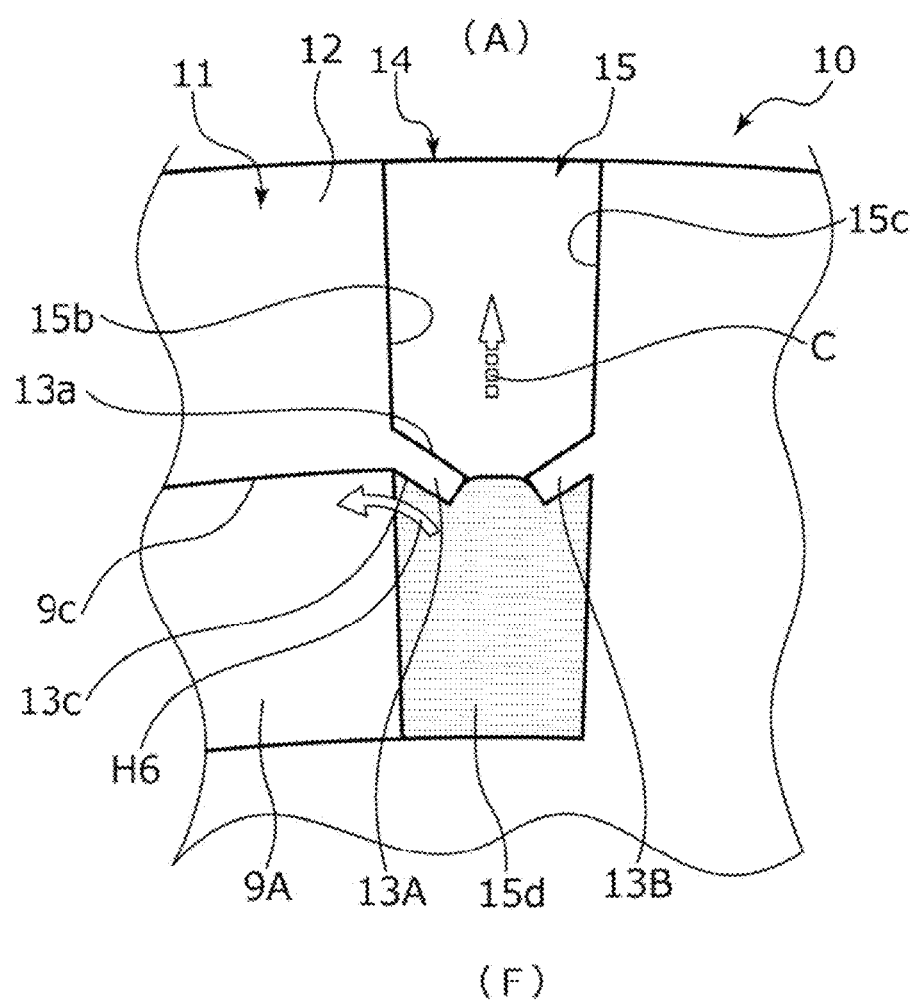
FIG. 6 is a main part enlarged view of the sliding surface of the stationary seal ring in the first embodiment.

In addition, referring to FIG. 6, as indicated by an arrow H6, since the high-pressure side wall surface 13c of the trap piece 13A is continuous with the low-pressure side wall surface 9c of the Rayleigh step 9A, the sealed liquid F can be directly guided from the high-pressure side wall surface 13c to the low-pressure side wall surface 9c of the Rayleigh step 9A. For this reason, the efficiency of suction of the sealed liquid F into the Rayleigh step 9A is good.

In addition, as illustrated in FIG. 6, since the mechanical seal of the present embodiment is an outside mechanical seal, as indicated by an arrow C, centrifugal force generated by rotation of the rotating seal ring 20 is applied to the sealed liquid F. Therefore, the sealed liquid F in the liquid guide groove portion 15 is biased in a leakage direction toward the atmosphere side which is the outer diameter side. However, since the sealed liquid F is a liquid and has higher viscosity than a gas, and the trap portion 13 counters the centrifugal force which is applied to the sealed liquid F by the high-pressure side wall surfaces 13c and 13c of the trap pieces 13A and 13B inclined toward the outer diameter side, which is the leakage direction of the sealed liquid F, from a central portion in the circumferential direction of the liquid guide groove portion 15 to the wall surfaces 15b and 15c, leakage to the atmosphere side can be suppressed. Further, since the high-pressure side wall surface 13c of the trap piece 13A can directly guide the sealed liquid F to the Rayleigh step 9A as described above, the efficiency of suction of the sealed liquid F from inside the liquid guide groove portion 15 into the Rayleigh step 9A can be increased by using the centrifugal force.

In addition, in the trap portion 13, since the width between the trap pieces 13A and 13B is narrow, the surface tension applied to the sealed liquid F existing between the trap pieces 13A and 13B counters the centrifugal force applied to the sealed liquid F. Accordingly, as illustrated with a half-tone dot portion in FIG. 6, the holding ability to hold the sealed liquid F on the inner diameter side of the trap portion 13 is increased.

As described above, when the stationary seal ring 10 and the rotating seal ring 20 rotate relative to each other, the low-pressure side fluid A on the atmosphere side is suctioned into the Rayleigh step 9A through the liquid guide groove portion 15, so that dynamic pressure is generated therein. Since the liquid guide groove portion 15 has a deep groove depth and a large volume, a large amount of the sealed liquid F supplied to the atmosphere side of the sliding surface 11 can be recovered and returned to the Rayleigh step 9A, and the lubricity can be improved by using a wide area extending to the low-pressure side of the sliding surface 11. In addition, since the liquid guide groove portion 15 is provided with the trap portion 13, the sealed liquid F is held in the liquid guide groove portion 15 against the centrifugal force that is generated in the sealed liquid F due to relative rotation of the stationary seal ring 10. Therefore, the sealed liquid F can be suppressed from leaking to the atmosphere side located on the outer diameter side.

In addition, since a large amount of the sealed liquid F is held in the liquid guide groove portion 15, the amount of the sealed liquid F suctioned into the Rayleigh step 9A can be sufficiently secured, and even when the amount of the sealed liquid F held in the liquid guide groove portion 15 increases or decreases in a short time, the amount of the sealed liquid F suctioned into the Rayleigh step 9A can be substantially constant, and the sliding surfaces 11 and 21 can be avoided from being subjected to poor lubrication. In addition, since the liquid guide groove portion 15 communicates with the low-pressure side, the pressure in the liquid guide groove portion 15 is lower than the pressure of the sealed liquid F between the sliding surfaces 11 and 21, and the sealed liquid F in the vicinity of the liquid guide groove portion 15 is easily suctioned into the liquid guide groove portion 15.

In addition, the liquid guide groove portion 15 extends in the radial direction. Specifically, since the liquid guide groove portion 15 extends in a direction orthogonal to a center axis of the stationary seal ring 10, and the Rayleigh step 9A is disposed in the circumferential direction from the outer diameter side end portion of the liquid guide groove portion 15 to intersect the liquid guide groove portion 15, the liquid guide groove portion 15 is unlikely to be affected by the inertia or dynamic pressure of a flow of the sealed liquid F, which is generated in the Rayleigh step 9A. For this reason, the sealed liquid F or the low-pressure side fluid A adhering to an inside surface of the stationary seal ring 10 is unlikely to be directly suctioned into the Rayleigh step 9A from the inner diameter side of the liquid guide groove portion 15. In addition, the sealed liquid F can be held in the liquid guide groove portion 15 without being directly affected by dynamic pressure.

In addition, the trap pieces 13A and 13B are continuous from the end surfaces thereof to the bottom surface 15d of the liquid guide groove portion 15 in the axial direction, the end surfaces facing the sliding surface 21 of the rotating seal ring 20, so that the rigidity against external force applied in the axial direction is increased. In addition, since the trap pieces 13A and 13B are continuous with the downstream wall surface 15b and the upstream wall surface 15c of the liquid guide groove portion 15, respectively, the rigidity in the circumferential direction is also increased. Namely, since the trap pieces 13A and 13B extend from the downstream wall surface 15b, the upstream wall surface 15c, and the bottom surface 15d of the liquid guide groove portion 15, the trap portion 13 having high rigidity can be easily formed.

In addition, since the trap portion 13 is disposed in a place where the liquid guide groove portion 15 and the Rayleigh step 9A intersect each other, the sealed liquid F moving from the liquid guide groove portion 15 to the Rayleigh step 9A is held, so that dynamic pressure can be reliably generated.

In addition, since the trap portion 13 is integrally molded with the base material forming the sliding surface 11, the trap portion 13 can be easily molded.

In addition, the width in the circumferential direction of the liquid guide groove portion 15 is shortened, so that a large number of the stationary seal rings 10 can be disposed in the circumferential direction. Therefore, the degree of freedom in design is high. Incidentally, the liquid guide groove portion 15 is not limited to extending in the direction orthogonal to the center axis of the stationary seal ring 10, and may be inclined from a position orthogonal to the center axis of the stationary seal ring 10. It is preferable that the inclination is less than 45 degrees. Further, the shape of the liquid guide groove portion 15 can be freely changed to an arc shape or the like.

In addition, since the step 18 is formed in the communication portion between the Rayleigh step 9A and the liquid guide groove portion 15 by a side surface on the downstream side of the liquid guide groove portion 15 and the bottom surface of the Rayleigh step 9A, the sealed liquid F can be held in the liquid guide groove portion 15 without being directly affected by dynamic pressure.

In addition, since the Rayleigh step 9A communicates with the liquid guide groove portion 15 over the entire width in the radial direction, an opening region of the Rayleigh step 9A to the liquid guide groove portion 15 can be secured, and the sealed liquid F held in the liquid guide groove portion 15 can be efficiently suctioned up.

In addition, since the dynamic pressure generating mechanism 14 is provided in the stationary seal ring 10, when the stationary seal ring 10 and the rotating seal ring 20 rotate relative to each other, the state inside the liquid guide groove portion 15 is easily kept close to atmospheric pressure.

Incidentally, in the first embodiment, a mode in which the liquid guide groove portion 15 and the Rayleigh step 9A form an inverted L shape when seen in the direction orthogonal to the sliding surface 11 has been provided as an example; however, for example, the liquid guide groove portion 15 and the Rayleigh step 9A may smoothly communicate with each other without intersecting each other, to form, for example, a linear shape or an arc shape.

In addition, the step 18 may not be provided in the communication portion between the liquid guide groove portion 15 and the Rayleigh step 9A, for example, the liquid guide groove portion 15 and the Rayleigh step 9A may communicate with each other through an inclined surface. In this case, for example, a portion having a depth dimension of 5 μm or less can be the Rayleigh step 9A as a shallow groove portion, and a portion which is deeper than 5 μm can be the liquid guide groove portion 15 as a deep groove portion.

In addition, the shallow groove portion is not limited to extending concentrically with the stationary seal ring in the circumferential direction, for example, may be formed in an arc shape such that the end portion on the downstream side faces the high-pressure side. In addition, the shallow groove portion may extend linearly from the deep groove portion, or may extend in a meandering manner.

In addition, the trap portion 13 may include only the trap piece 13A disposed on the Rayleigh step 9A side which is a dynamic pressure generating groove, the dimension of the trap piece 13A may be appropriately changed, and the trap piece 13A may be disposed to be separated from the low-pressure side wall surface 9c of the Rayleigh step 9A in the radial direction. Similarly, the trap portion 13 may include only the trap piece 13B disposed on a side facing the Rayleigh step 9A.

In addition, a mode in which the trap piece 13A forms the same plane as that of the land 12 has been provided as an example; however, for example, the trap piece 13A may be recessed from the land 12 in the axial direction. In addition, a mode in which the trap piece 13A is continuous to the bottom surface 15d of the liquid guide groove portion 15 in the axial direction has been provided as an example; however, for example, a lower end portion of the trap piece 13A may be separated from the bottom surface 15d of the liquid guide groove portion 15, or a part in the axial direction of the trap piece 13A may be divided in the middle thereof. Namely, the trap piece 13A may be configured such that centrifugal force can be suppressed from causing the sealed liquid F to leak from inside the liquid guide groove portion 15 to the atmosphere side, and the shape of the trap piece 13A may be appropriately changed.

In addition, a mode in which the trap piece 13A is integrally molded with the base material forming the sliding surface 11 has been provided as an example; however, the present invention is not limited to the mode, and a trap piece which is formed separately from the base material forming the sliding surface 11 may be fixed to an inner surface of the liquid guide groove portion 15.

Second Embodiment

Next, a sliding component according to a second embodiment of the present invention will be described with reference to FIGS. 7 and 8. Incidentally, the description of configurations which are the same as and duplicated from those in the first embodiment will be omitted.

Figure 7:
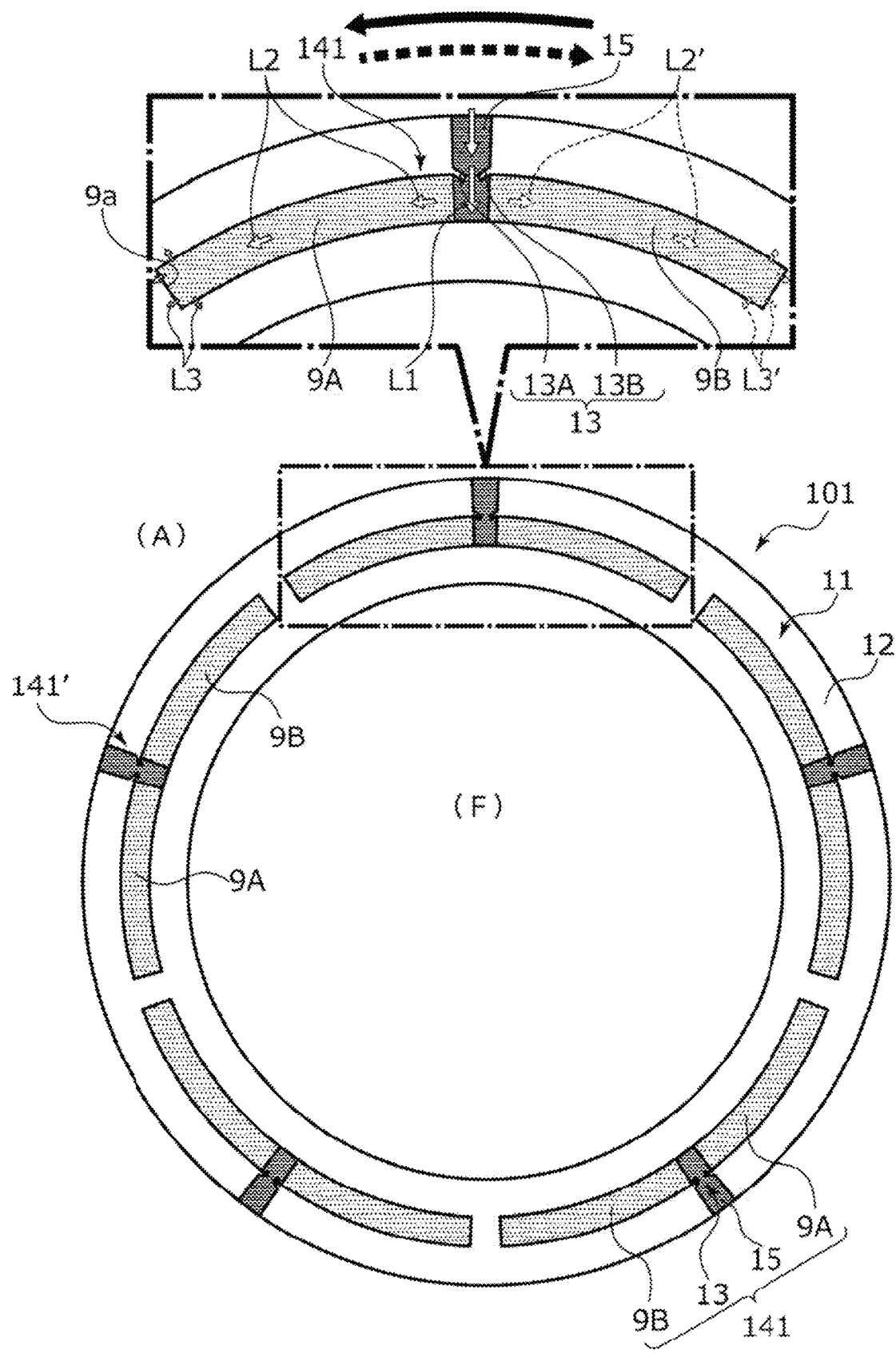
FIG. 7 is a view of a sliding surface of a stationary seal ring as a sliding component according to a second embodiment of the present invention when seen in the axial direction.
Figure 8:
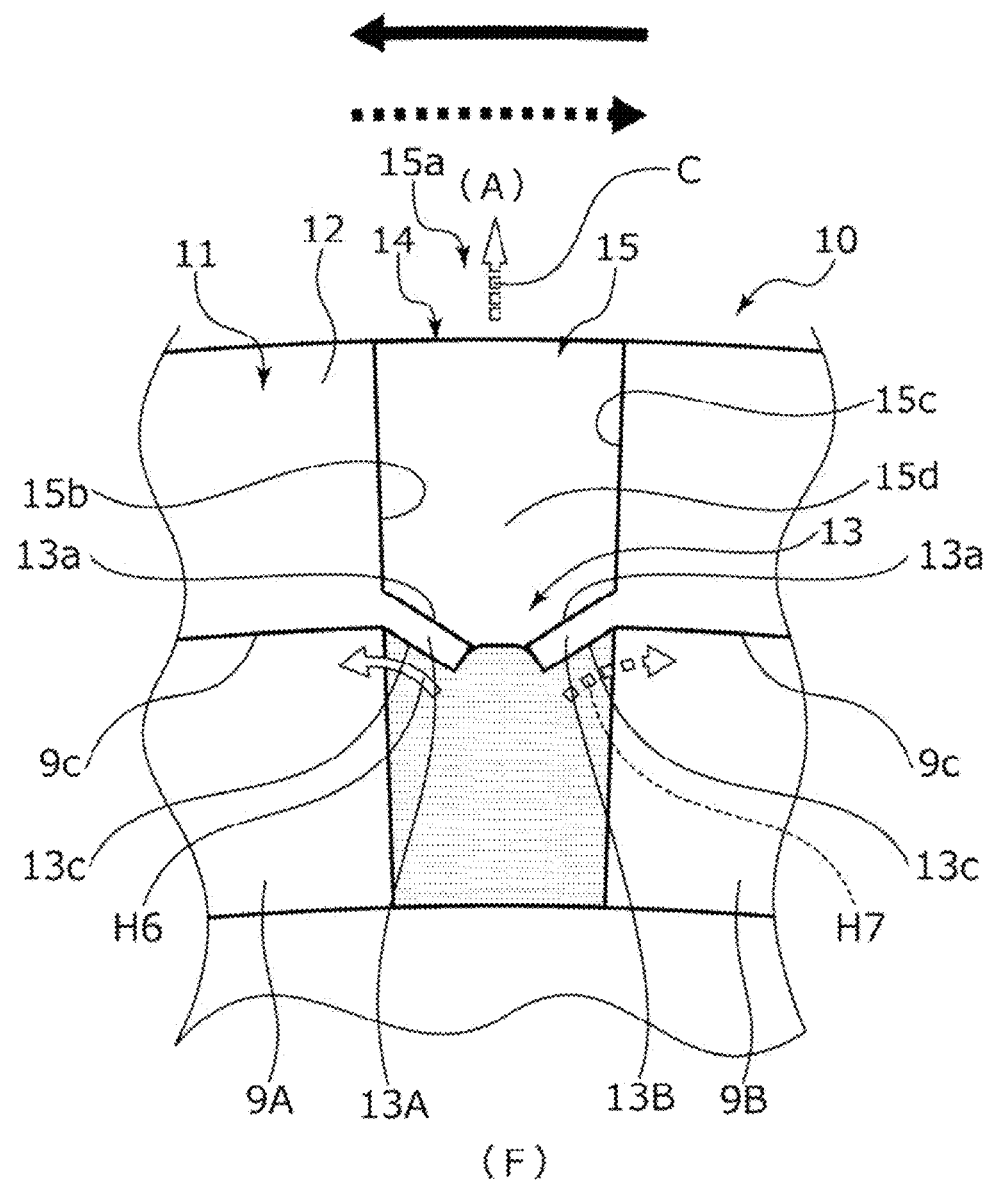
FIG. 8 is a main part enlarged view of the sliding surface of the stationary seal ring in the second embodiment.

As illustrated in FIGS. 7 and 8, a dynamic pressure generating mechanism 141 provided in a stationary seal ring 101 includes the liquid guide groove portion 15, the Rayleigh step 9A, a reverse Rayleigh step 9B as a shallow groove portion that extends concentrically with the stationary seal ring 101 from the inner diameter side end portion of the liquid guide groove portion 15 toward the upstream side in the circumferential direction, and the trap portion 13. Namely, the dynamic pressure generating mechanism 141 has a T shape when seen in the direction orthogonal to the sliding surface 11. In addition, the reverse Rayleigh step 9B is formed with the same depth dimension of 5 μm as that of the Rayleigh step 9A.

The trap piece 13B is provided with the low-pressure side wall surface 13a that extends to the inner diameter side from the upstream wall surface 15c of the liquid guide groove portion 15 toward the center side in the circumferential direction of the liquid guide groove portion 15, the upstream wall surface 15c being located closer to the outer diameter side than the low-pressure side wall surface 9c extending in the circumferential direction of the reverse Rayleigh step 9B, and the high-pressure side wall surface 13c that is continuous with the low-pressure side wall surface 9c of the reverse Rayleigh step 9B and extends to the inner diameter side from the upstream wall surface 15c of the liquid guide groove portion 15 toward the center side in the circumferential direction of the liquid guide groove portion 15.

When the rotating seal ring 20 rotates counterclockwise on the drawing sheet as indicated by a solid arrow of FIG. 7, the low-pressure side fluid A moves in order of arrows L1, L2, and L3, so that dynamic pressure is generated in the Rayleigh step 9A. In addition, when the rotating seal ring 20 rotates clockwise on the drawing sheet as indicated by a dotted arrow of FIG. 7, the low-pressure side fluid A moves in order of arrows L1, L2', and L3', so that dynamic pressure is generated in the reverse Rayleigh step 9B. Namely, when the rotating seal ring 20 rotates clockwise on the drawing sheet of FIG. 7, the reverse Rayleigh step 9B functions as a Rayleigh step, and the Rayleigh step 9A functions as a reverse Rayleigh step.

As described above, since the Rayleigh step 9A and the reverse Rayleigh step 9B extend from the liquid guide groove portion 15 to both sides in the circumferential direction, and one of the Rayleigh step 9A and the reverse Rayleigh step 9B can be used as a shallow groove portion for generating dynamic pressure, the Rayleigh step 9A or the reverse Rayleigh step 9B can be used regardless of the relative rotational direction of the stationary seal ring 101 and the rotating seal ring 20.

In addition, the Rayleigh step 9A of the dynamic pressure generating mechanism 141 is adjacent, in the circumferential direction, to the reverse Rayleigh step 9B of a dynamic pressure generating mechanism 141' adjacent thereto. Accordingly, the sealed liquid F which flows out from the vicinity of the wall portion 9a of the Rayleigh step 9A of the dynamic pressure generating mechanism 141 to a peripheral portion thereof to tend to move to the inner diameter side is suctioned from the reverse Rayleigh step 9B of the dynamic pressure generating mechanism 141' adjacent thereto. Therefore, a leakage of the sealed liquid F to the low-pressure side can be reduced.

In addition, when the rotating seal ring 20 rotates counterclockwise on the drawing sheet as indicated by a solid arrow of FIG. 8, similar to the first embodiment, the trap portion 13 can suppress the sealed liquid F from leaking to the atmosphere side located on the outer diameter side. In addition, when the rotating seal ring 20 rotates clockwise on the drawing sheet as indicated by a dotted arrow of FIG. 8, the trap portion 13 does not prevent movement of the sealed liquid F from the atmosphere side to a sealed liquid F side, as indicated by an arrow H7, the efficiency of suction of the sealed liquid F to the reverse Rayleigh step 9B by the high-pressure side wall surface 13c of the trap piece 13B continuous with the low-pressure side wall surface 9c is good, and the width between the trap pieces 13A and 13B is narrow. Therefore, surface tension is generated in the sealed liquid F existing between the trap pieces 13A and 13B, the surface tension counters the centrifugal force applied to the sealed liquid F, so that the holding ability to hold the sealed liquid F on the inner diameter side of the trap portion 13 as illustrated with a halftone dot portion is increased. Namely, the function of holding the sealed liquid F can be exhibited to correspond to the stationary seal ring 101 rotating to both sides in the circumferential direction.

Incidentally, in the second embodiment, a case where the Rayleigh step 9A and the reverse Rayleigh step 9B have the same depth dimension has been provided as an example; however, the Rayleigh step 9A and the reverse Rayleigh step 9B may be formed with different depth dimensions. In addition, both may be the same or different from each other also in length in the circumferential direction and width in the radial direction.

In addition, the Rayleigh step 9A of the dynamic pressure generating mechanism 141 and the reverse Rayleigh step 9B of the dynamic pressure generating mechanism 141' adjacent thereto may be separated from each other by a long distance in the circumferential direction to further increase the pressure which separates the sliding surfaces 11 and 21 from each other.

Third Embodiment

Next, a sliding component according to a third embodiment of the present invention will be described with reference to FIG. 9. Incidentally, the description of configurations which are the same as and duplicated from those in the second embodiment will be omitted.

Figure 9:
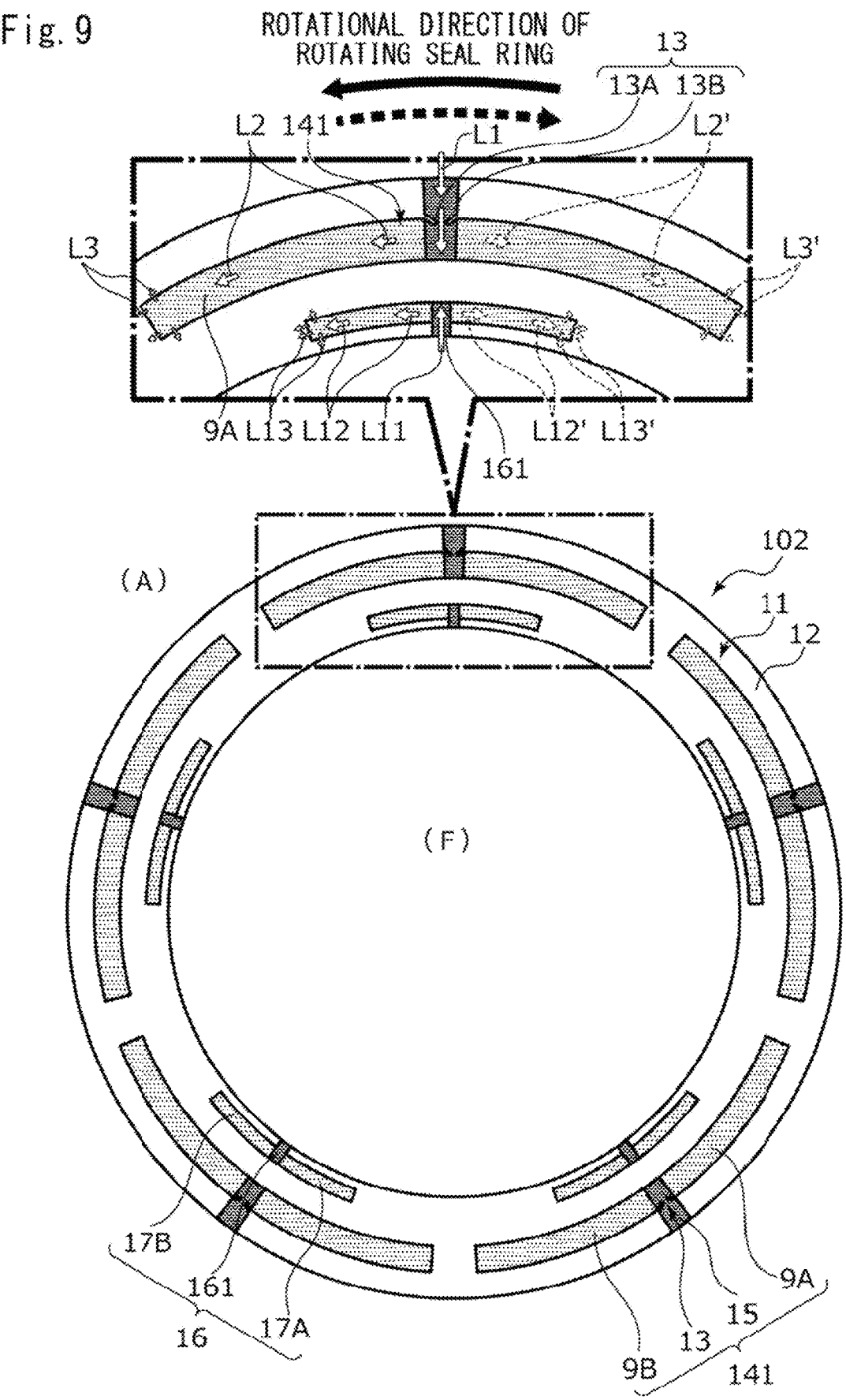
FIG. 9 is a view of a sliding surface of a stationary seal ring as a sliding component according to a third embodiment of the present invention when seen in the axial direction.

As illustrated in FIG. 9, a plurality of the dynamic pressure generating mechanisms 141 and a plurality of specific dynamic pressure generating mechanisms 16 are formed in a stationary seal ring 102. The specific dynamic pressure generating mechanism 16 includes a liquid guide groove portion 161 communicating with the high-pressure side, a Rayleigh step 17A that extends concentrically with the stationary seal ring 102 from an outer diameter side end portion of the liquid guide groove portion 161 toward the downstream side in the circumferential direction, and a reverse Rayleigh step 17B that extends concentrically with the stationary seal ring 102 from the outer diameter side end portion of the liquid guide groove portion 161 toward the upstream side in the circumferential direction. The liquid guide groove portion 161 and the liquid guide groove portion 15 are formed at positions corresponding to each other in the circumferential direction. In addition, the liquid guide groove portion 161 functions as a deep groove portion of the specific dynamic pressure generating mechanism 16, and the Rayleigh step 17A and the reverse Rayleigh step 17B function as shallow groove portions of the specific dynamic pressure generating mechanism 16.

The Rayleigh step 9A and the reverse Rayleigh step 9B of the dynamic pressure generating mechanism 141 are formed to be longer in the circumferential direction than the Rayleigh step 17A and the reverse Rayleigh step 17B of the specific dynamic pressure generating mechanism 16. In addition, the Rayleigh step 17A and the reverse Rayleigh step 17B are formed with the same depth dimension of 5 μm as that of the Rayleigh step 9A and the reverse Rayleigh step 9B. In addition, the width in the radial direction of the Rayleigh step 17A and the reverse Rayleigh step 17B is smaller than the width in the radial direction of the Rayleigh step 9A and the reverse Rayleigh step 9B. Namely, the volume of the dynamic pressure generating mechanism 141 is larger than the volume of the specific dynamic pressure generating mechanism 16.

When the rotating seal ring 20 rotates counterclockwise on the drawing sheet as indicated by a solid arrow of FIG. 9, the sealed liquid F moves in order of arrows L11, L12, and L13, so that dynamic pressure is generated in the Rayleigh step 17A. In addition, when the rotating seal ring 20 rotates clockwise on the drawing sheet as indicated by a dotted arrow of FIG. 9, the sealed liquid F moves in order of arrows L11, L12', and L13', so that dynamic pressure is generated in the reverse Rayleigh step 17B. In such a manner, regardless of the relative rotational direction of the stationary seal ring 102 and the rotating seal ring 20, dynamic pressure can be generated in the specific dynamic pressure generating mechanism 16.

In addition, while the dynamic pressure generated in the specific dynamic pressure generating mechanism 16 separates the sliding surfaces 11 and 21 from each other to form an appropriate liquid film therebetween, the sealed liquid F which tends to leak from the sliding surface 11 to the low-pressure side can be recovered by the dynamic pressure generating mechanism 141.

In addition, since the volume of the dynamic pressure generating mechanism 141 is larger than the volume of the specific dynamic pressure generating mechanism 16, the suctioning force of the Rayleigh step 9A and the reverse Rayleigh step 9B of the dynamic pressure generating mechanism 141 is increased, so that a balance in dynamic pressure between the dynamic pressure generating mechanism 141 on the low-pressure side and the specific dynamic pressure generating mechanism 16 on the high-pressure side can be adjusted.

In addition, since the wall portion 9a which is an end of the dynamic pressure generating mechanism 141 and a wall portion 17a which is an end of the specific dynamic pressure generating mechanism 16 are shifted from each other in the circumferential direction, the pressure can be distributed with good balance in the circumferential direction of the sliding surfaces 11 and 21.

Incidentally, the length in the circumferential direction of the Rayleigh step 9A and the reverse Rayleigh step 9B may be the same as that of the Rayleigh step 17A and the reverse Rayleigh step 17B, or may be shorter than that of the Rayleigh step 17A and the reverse Rayleigh step 17B. In addition, the Rayleigh step 17A and the reverse Rayleigh step 17B may be formed with a depth dimension different from that of the Rayleigh step 9A and the reverse Rayleigh step 9B. In addition, the width in the radial direction of the Rayleigh step 17A and the reverse Rayleigh step 17B may be larger than the width in the radial direction of the Rayleigh step 9A and the reverse Rayleigh step 9B. Preferably, the volume of the dynamic pressure generating mechanism 141 may be larger than the volume of the specific dynamic pressure generating mechanism 16.

In addition, in the sliding surface 11, the dimension in the radial direction from an outer diameter side end edge of the sliding surface 11 to an outer diameter side end edge of the Rayleigh step 9A of the dynamic pressure generating mechanism 141, the dimension in the radial direction from an inner diameter side end edge of the Rayleigh step 9A of the dynamic pressure generating mechanism 141 to an outer diameter side end edge of the Rayleigh step 17A of the specific dynamic pressure generating mechanism 16, and the dimension in the radial direction from an inner diameter side end edge of the Rayleigh step 17A of the specific dynamic pressure generating mechanism 16 to an inner diameter side end edge of the sliding surface 11 may be appropriately changed. Accordingly, the amount of the sealed liquid F leaking from between the sliding surfaces 11 and 21 to the atmosphere side and the amount of the sealed liquid F recovered by the dynamic pressure generating mechanism can be more suitably balanced according to the rotational speed of the rotating seal ring 20 and the pressure of the sealed liquid F. Namely, the sealed liquid F can be suppressed from leaking to the atmosphere side.

Fourth Embodiment

Figure 10:
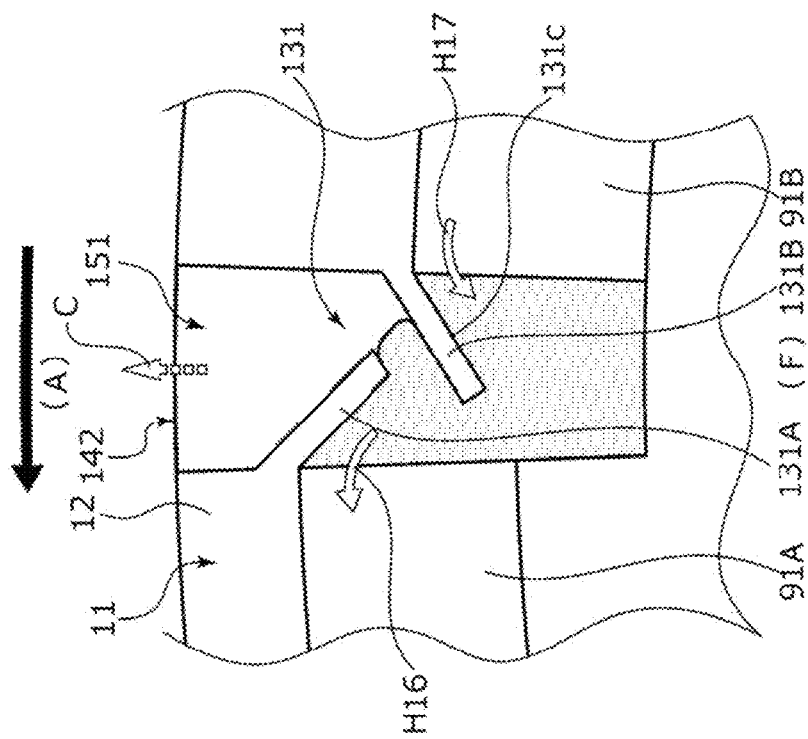
FIG. 10 is a main part enlarged view of a sliding surface of a stationary seal ring as a sliding component according to a fourth embodiment of the present invention.

Next, a stationary seal ring as a sliding component according to a fourth embodiment of the present invention will be described with reference to FIG. 10. Incidentally, the description of configurations which are the same as and duplicated from those in the second embodiment will be omitted. In addition, here, only the form of a dynamic pressure generating mechanism 142 will be described.

The dynamic pressure generating mechanism 142 includes the liquid guide groove portion 151, a Rayleigh step 91A that extends from the center in the radial direction of the liquid guide groove portion 151 to the downstream side in the circumferential direction (i.e., left side of the figure), a reverse Rayleigh step 91B that extends from an inner diameter side end portion in the radial direction of the liquid guide groove portion 151 to the upstream side in the circumferential direction (i.e., right side of the figure), the inner diameter side end portion being located closer to the inner diameter side than the Rayleigh step 91A, and a trap portion 131. The trap portion 131 includes trap pieces 131A and 131B that are alternately disposed in the radial direction.

Accordingly, when the rotating seal ring 20 rotates counterclockwise, in the trap portion 131, centrifugal force toward the atmosphere side is applied to the sealed liquid F in the liquid guide groove portion 151, and the sealed liquid F on the inner diameter side of the trap piece 131B is guided to the downstream side by an inner diameter side wall portion 131c and is guided to the Rayleigh step 91A on the further downstream side by the inner diameter side wall portion 131c of the trap piece 131A. Therefore, the sealed liquid F is unlikely to move to the atmosphere side of the trap portion 131. In other words, since the trap portion 131 makes it difficult for the sealed liquid F to linearly move in the radial direction, the function of holding the sealed liquid F in the liquid guide groove portion 151 can be improved.

In addition, in the trap portion 131, since the width between the trap pieces 131A and 131B is narrow, surface tension is generated in the sealed liquid F existing between the trap pieces 131A and 131B, and the surface tension counters the centrifugal force applied to the sealed liquid F, so that as illustrated with a halftone dot portion, the holding ability to hold the sealed liquid F on the inner diameter side of the trap portion 131 is increased.

Fifth Embodiment

Figure 11:
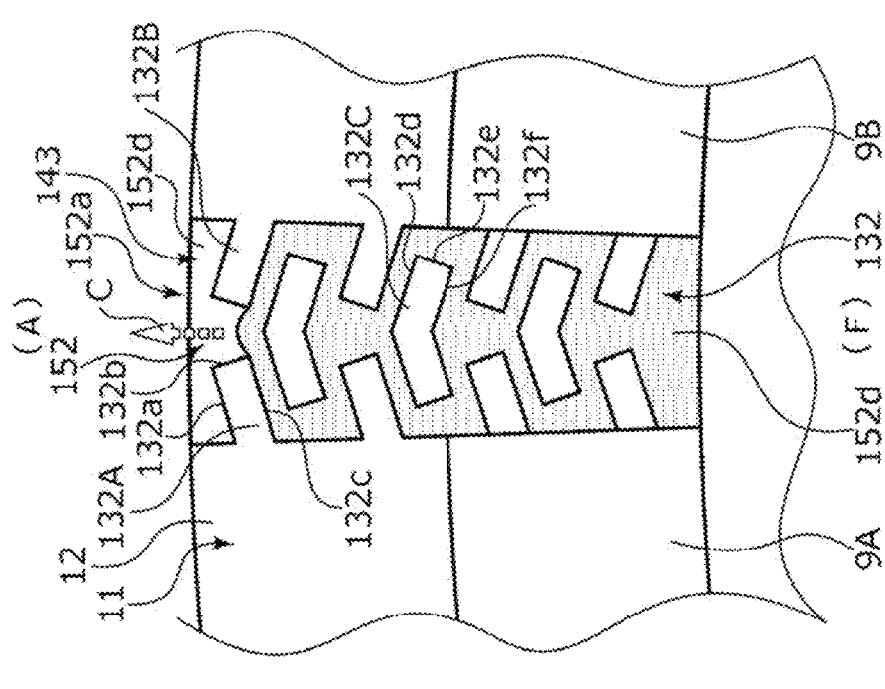
FIG. 11 is a main part enlarged view of a sliding surface of a stationary seal ring as a sliding component according to a fifth embodiment of the present invention.

Next, a stationary seal ring as a sliding component according to a fifth embodiment of the present invention will be described with reference to FIG. 11. Incidentally, the description of configurations which are the same as and duplicated from those in the second embodiment will be omitted. In addition, here, only the form of a dynamic pressure generating mechanism 143 will be described.

The dynamic pressure generating mechanism 143 includes the Rayleigh step 9A, the reverse Rayleigh step 9B, a liquid guide groove portion 152, and a trap portion 132. The trap portion 132 includes a plurality of trap pieces 132A that are disposed at predetermined intervals from the vicinity of an opening portion 152a of the liquid guide groove portion 152 to the vicinity of an inner diameter side end portion intersecting the Rayleigh step 9A, a plurality of trap pieces 132B that are disposed to be axisymmetric with the trap pieces 132A with respect to an imaginary center line of the liquid guide groove portion 152, the imaginary center line extending in the radial direction, and a plurality of trap pieces 132C that are disposed in a central portion in the circumferential direction of the liquid guide groove portion 152 in places where the trap pieces 132C each are surrounded by four trap pieces 132A, 132A, 132B, and 132B adjacent to each other.

The trap piece 132A extends to the outer diameter side from the downstream side of the liquid guide groove portion 152 toward a center side in the circumferential direction of the liquid guide groove portion 152. In addition, the trap piece 132A is provided with a low-pressure side wall surface 132a that extends to the outer diameter side from the downstream side of the liquid guide groove portion 152 toward the upstream side, a center side wall surface 132b that is orthogonal to an end portion on the upstream side of the low-pressure side wall surface 132a and extends to the inner diameter side from the end portion toward the upstream side, and a downstream wall surface 132c that is orthogonal to an end portion on the inner diameter side of the center side wall surface 132b and extends to the inner diameter side from the end portion toward the downstream side.

The trap piece 132C is axisymmetrically formed with respect to the imaginary center line of the liquid guide groove portion 152, the imaginary center line extending in the radial direction, and extends from the central portion in the circumferential direction of the liquid guide groove portion 152 to the inner diameter side on the downstream side and the inner diameter side on the upstream side. In addition, the trap piece 132C is provided with low-pressure side wall surfaces 132d and 132d that extend from the central portion in the circumferential direction of the liquid guide groove portion 152 to the inner diameter side on the downstream side and the inner diameter side on the upstream side, center side wall surfaces 132e and 132e that are orthogonal to an end portion on the downstream side and an end portion on the upstream side of the low-pressure side wall surfaces 132d and 132d and extend to the inner diameter side from the end portions toward the upstream side and the downstream side, and inner diameter side wall portions 132f and 132f that are orthogonal to end portions on the inner diameter side of the center side wall surfaces 132e and 132e and extend to the outer diameter side from the end portions toward the upstream side and the downstream side. An end surface of the trap piece 132C forms the same plane as that of the land 12, the end surface facing the sliding surface 21 of the rotating seal ring 20, and the trap piece 132C is continuous to a bottom surface 152d of the liquid guide groove portion 152 in the axial direction.

In addition, an end portion on the downstream side of the trap piece 132C is disposed to overlap and alternate with an end portion on the upstream side of the trap piece 132A adjacent thereto in the circumferential direction, and an end portion on the upstream side of the trap piece 132C is disposed to overlap and alternate with an end portion on the downstream side of the trap piece 132B adjacent thereto in the circumferential direction.

Accordingly, the center side wall surfaces 132b and 132b of the trap pieces 132A and 132B inclined to the inner diameter side toward an inflow direction of the sealed liquid F, and the low-pressure side wall surfaces 132d and 132d and the center side wall surfaces 132e and 132e of the trap piece 132C function as guide surfaces that guide the sealed liquid F to the Rayleigh step 9A side, and therefore, even when the flow path is narrowed by the trap portion 132, the trap portion 132 is unlikely to prevent the sealed liquid F from entering the liquid guide groove portion 152.

In addition, in the trap portion 132, since the widths between the trap pieces 132A, 132B, and 132C are narrow, surface tension is generated in the sealed liquid F existing between the trap pieces 132A, 132B, and 132C, and the surface tension counters the centrifugal force applied to the sealed liquid F, so that as illustrated with a halftone dot portion, the holding ability to hold the sealed liquid F on the inner diameter side of the trap portion 132 is increased.

In addition, since the inner diameter side wall portions 132f and 132f of the trap piece 132C can trap the sealed liquid F tending to leak from inside the liquid guide groove portion 152 to the atmosphere side, the sealed liquid F can be suitably suppressed from leaking to the atmosphere side.

In addition, the trap piece 132C is continuous to the bottom surface 152d of the liquid guide groove portion 152 in the axial direction, so that the rigidity against external force applied in the axial direction is increased. Namely, since the trap piece 132C extends from the bottom surface 152d of the liquid guide groove portion 152, the trap portion 132 having high rigidity can be easily formed.

Sixth Embodiment

Figure 12:
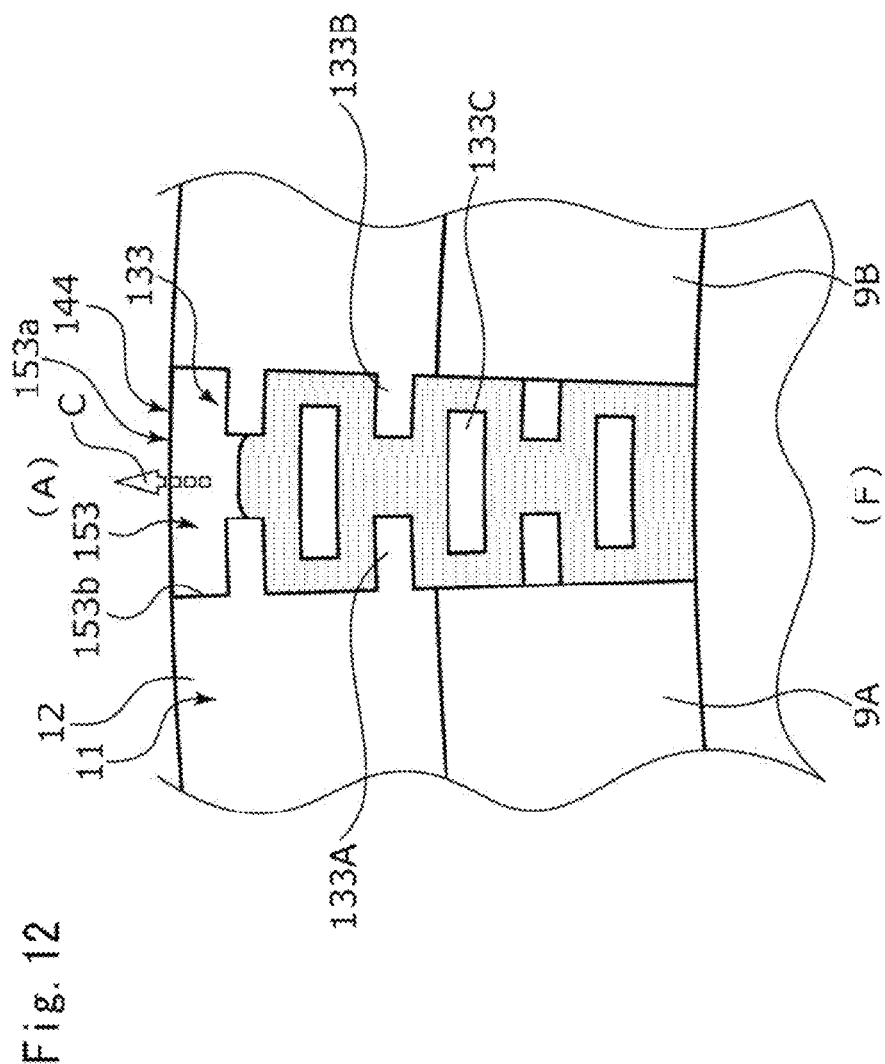
FIG. 12 is a main part enlarged view of a sliding surface of a stationary seal ring as a sliding component according to a sixth embodiment of the present invention.

Next, a stationary seal ring as a sliding component according to a sixth embodiment of the present invention will be described with reference to FIG. 12. Incidentally, the description of configurations which are the same as and duplicated from those in the second embodiment will be omitted. In addition, here, only the form of a dynamic pressure generating mechanism 144 will be described.

The dynamic pressure generating mechanism 144 includes the Rayleigh step 9A, the reverse Rayleigh step 9B, a liquid guide groove portion 153, and a trap portion 133. The trap portion 133 includes a plurality of trap pieces 133A that are disposed at predetermined intervals from the vicinity of an opening portion 153a of the liquid guide groove portion 153 to the vicinity of an inner diameter side end portion intersecting the Rayleigh step 9A, a plurality of trap pieces 133B that are disposed to be axisymmetric with the trap pieces 133A with respect to an imaginary center line in the radial direction of the liquid guide groove portion 153, and a plurality of trap pieces 133C that are disposed in a central portion in the circumferential direction of the liquid guide groove portion 153 in places where the trap pieces 133C each are surrounded by four trap pieces 133A, 133A, 133B, and 133B adjacent to each other.

The trap piece 133A is orthogonal to a downstream wall surface 153b of the liquid guide groove portion 153 and extends to a central portion side in the radial direction of the liquid guide groove portion 153. In addition, the trap piece 133C extends in parallel to the trap pieces 133A and 133B.

In addition, in the trap portion 133, since the widths between the trap pieces 133A, 133B, and 133C are narrow, surface tension is generated in the sealed liquid F existing between the trap pieces 133A, 133B, and 133C, and the surface tension counters the centrifugal force applied to the sealed liquid F, so that as illustrated with a halftone dot portion, the holding ability to hold the sealed liquid F on the inner diameter side of the trap portion 133 is increased.

Seventh Embodiment

Figure 13:
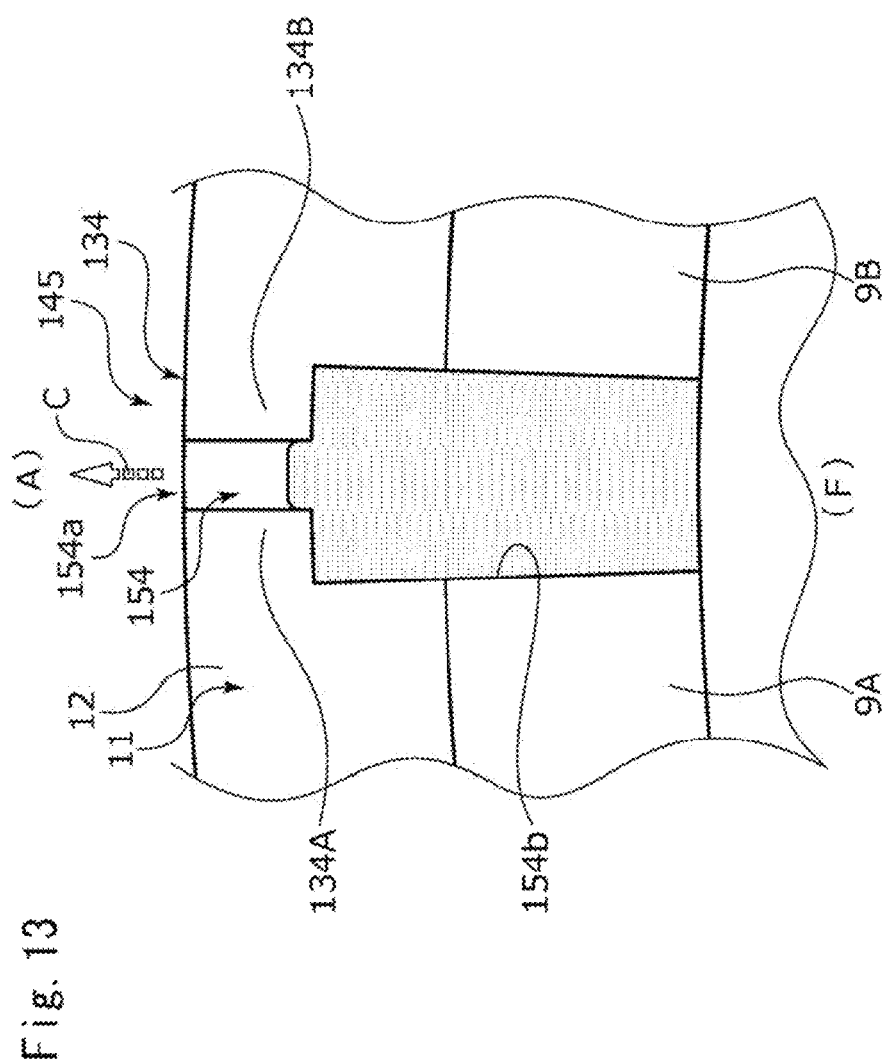
FIG. 13 is a main part enlarged view of a sliding surface of a stationary seal ring as a sliding component according to a seventh embodiment of the present invention.

Next, a stationary seal ring as a sliding component according to a seventh embodiment of the present invention will be described with reference to FIG. 13. Incidentally, the description of configurations which are the same as and duplicated from those in the second embodiment will be omitted. In addition, here, only the form of a dynamic pressure generating mechanism 145 will be described.

The dynamic pressure generating mechanism 145 includes the Rayleigh step 9A, the reverse Rayleigh step 9B, a liquid guide groove portion 154, and a trap portion 134. The trap portion 134 includes a trap piece 134A that is disposed in an opening portion 154a of the liquid guide groove portion 154 and extends from a downstream wall surface 154b of the liquid guide groove portion 154 to a center side in the circumferential direction of the liquid guide groove portion 154, and a trap piece 134B that is disposed to be axisymmetric with the trap piece 134A with respect to an imaginary center line of the liquid guide groove portion 154, the imaginary center line extending in the radial direction.

Accordingly, in the trap portion 134, since the width between the trap pieces 134A and 134B is narrow, surface tension is generated in the sealed liquid F existing between the trap pieces 134A and 134B, and the surface tension counters the centrifugal force applied to the sealed liquid F, so that as illustrated with a halftone dot portion, the holding ability to hold the sealed liquid F on the inner diameter side of the trap portion 134 is increased.

In addition, since the trap portion 134 is disposed in the opening portion 154a of the liquid guide groove portion 154, the volume of the liquid guide groove portion 154 on the inner diameter side of the trap portion 134 can be suitably secured. Namely, the amount of the sealed liquid F held in the liquid guide groove portion 154 can be secured. Incidentally, the trap portion is disposed in a place near an opening portion which communicates with the low-pressure side rather than the high-pressure side of the liquid guide groove portion including opening portions, so that the amount of the sealed liquid F held in the liquid guide groove portion can be secured. Regarding the place near the opening portion referred to here, the trap portion may be disposed within one third of the dimension in the radial direction of the liquid guide groove portion from the opening portion, preferably, may be disposed within one fourth of the dimension in the radial direction of the liquid guide groove portion from the opening portion.

Eighth Embodiment

Figure 14:
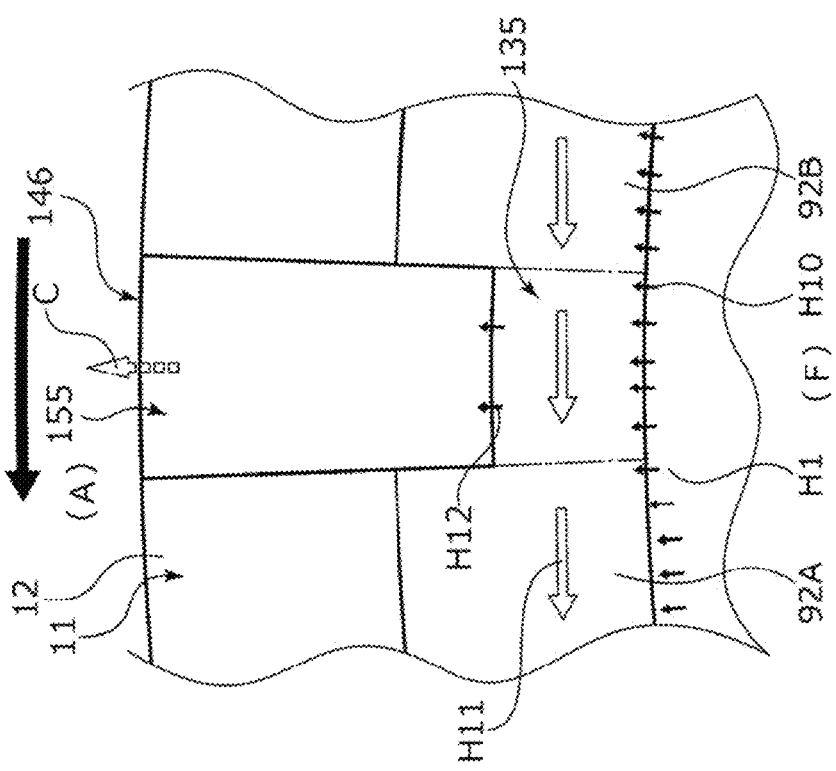
FIG. 14 is a main part enlarged view of a sliding surface of a stationary seal ring as a sliding component according to an eighth embodiment of the present invention.

Next, a stationary seal ring as a sliding component according to an eighth embodiment of the present invention will be described with reference to FIG. 14. Incidentally, the description of configurations which are the same as and duplicated from those in the second embodiment will be omitted. In addition, here, only the form of a dynamic pressure generating mechanism 146 will be described.

The dynamic pressure generating mechanism 146 includes a Rayleigh step 92A, a reverse Rayleigh step 92B, a liquid guide groove portion 155 that extends from a central portion in the radial direction between the Rayleigh step 92A and the reverse Rayleigh step 92B in an outer diameter direction, and a trap portion 135. The trap portion 135 is formed in a place where an inner diameter side end portion of the liquid guide groove portion 155 intersects the Rayleigh step 92A and the reverse Rayleigh step 92B, and is a shallow groove having the same depth dimension as the depth dimension of the Rayleigh step 92A and the reverse Rayleigh step 92B. The trap portion 135 communicates with the Rayleigh step 92A, the reverse Rayleigh step 92B, and the liquid guide groove portion 155.

Accordingly, when the rotating seal ring 20 rotates counterclockwise on the drawing sheet as indicated by a solid arrow, in the trap portion 135, a majority of the sealed liquid F flowing in from the inner diameter side of the trap portion 135 or the reverse Rayleigh step 92B as indicated by an arrow H10 is suctioned into the Rayleigh step 92A as indicated by an arrow H11. Therefore, the inflow amount of the sealed liquid F flowing into the liquid guide groove portion 155 due to centrifugal force as indicated by an arrow H12 is reduced. Accordingly, leakage from the liquid guide groove portion 155 to the atmosphere side can be relatively suppressed. Incidentally, although a direct illustration is omitted, the same also applies to when the rotating seal ring 20 rotates clockwise on the drawing sheet, except that the direction of the arrow H11 is an opposite direction.

Ninth Embodiment

Figure 15:
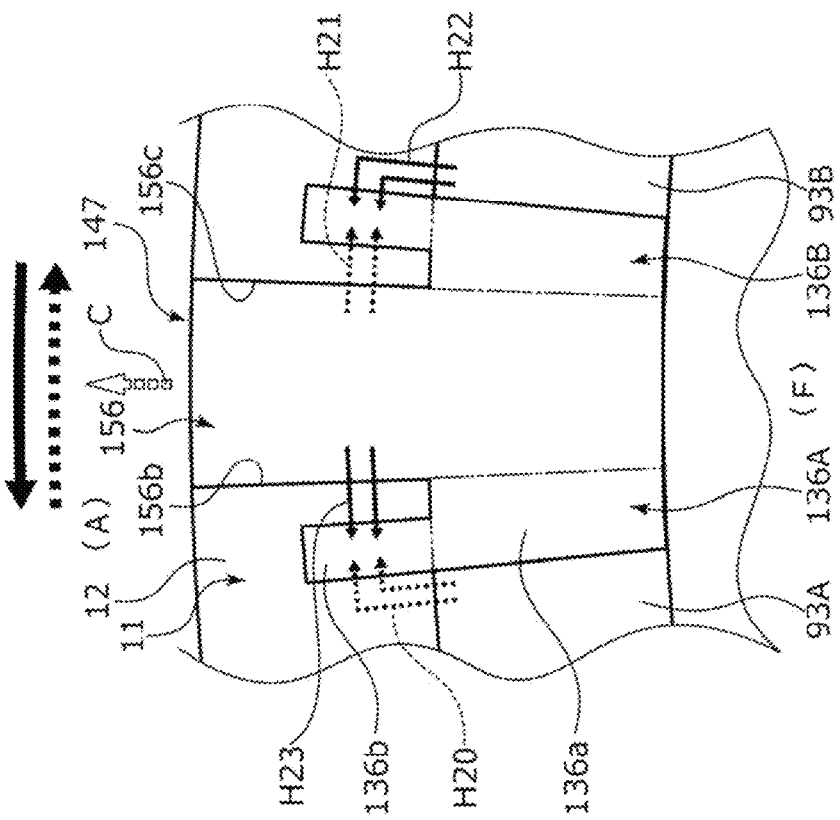
FIG. 15 is a main part enlarged view of a sliding surface of a stationary seal ring as a sliding component according to a ninth embodiment of the present invention.

Next, a stationary seal ring as a sliding component according to a ninth embodiment of the present invention will be described with reference to FIG. 15. Incidentally, the description of configurations which are the same as and duplicated from those in the second embodiment will be omitted. In addition, here, only the form of a dynamic pressure generating mechanism 147 will be described.

The dynamic pressure generating mechanism 147 includes a Rayleigh step 93A, a reverse Rayleigh step 93B, a liquid guide groove portion 156, and trap portions 136A and 136B. The trap portions 136A and 136B are deep grooves having the same depth dimension as the depth dimension of the liquid guide groove portion 156, and are axisymmetrically disposed with respect to an imaginary center line of the liquid guide groove portion 156, the imaginary center line extending in the radial direction. The trap portion 136A includes a peripheral portion 136a that extends from an inner diameter side end portion of the liquid guide groove portion 156 in the circumferential direction at the same curvature as that of the Rayleigh step 93A, and a radial portion 136b that communicates with the peripheral portion 136a and extends in the radial direction. The peripheral portion 136a of the trap portion 136A communicates with the Rayleigh step 93A and the liquid guide groove portion 156, and the peripheral portion 136a of the trap portion 136B communicates with the liquid guide groove portion 156 and the reverse Rayleigh step 93B.

Accordingly, when the rotating seal ring 20 rotates counterclockwise on the drawing sheet as indicated by a solid arrow, in the trap portions 136A and 136B, the sealed liquid F which has leaked from the reverse Rayleigh step 93B to the outer diameter side due to centrifugal force flows into the radial portion 136b of the trap portion 136B as indicated by a solid arrow H22, and the sealed liquid F which has leaked from a downstream wall surface 156b of the liquid guide groove portion 156 to the downstream side in the circumferential direction (left side of the drawing sheet) flows into the radial portion 136b of the trap portion 136A as indicated by a solid arrow H23. Therefore, leakage from the dynamic pressure generating mechanism 147 to the atmosphere side can be suppressed.

In addition, when the rotating seal ring 20 rotates clockwise on the drawing sheet as indicated by a dotted arrow, in the trap portions 136A and 136B, the sealed liquid F which has leaked from the Rayleigh step 93A to the outer diameter side due to centrifugal force flows into the radial portion 136b of the trap portion 136A as indicated by a dotted arrow H20, and the sealed liquid F which has leaked from an upstream wall surface 156c of the liquid guide groove portion 156 to the downstream side in the circumferential direction (i.e., right side of the drawing sheet) flows into the radial portion 136b of the trap portion 136B as indicated by a dotted arrow H21. Therefore, leakage from the dynamic pressure generating mechanism 147 to the atmosphere side can be suppressed.

In addition, in the dynamic pressure generating mechanism 147, since not only the liquid guide groove portion 156 but also the trap portions 136A and 136B can hold the sealed liquid F, and the sealed liquid F can flow into the Rayleigh step 93A and the reverse Rayleigh step 93B through the peripheral portions 136a and 136a, a larger amount of the sealed liquid F can be held.

Tenth Embodiment

Figure 16:
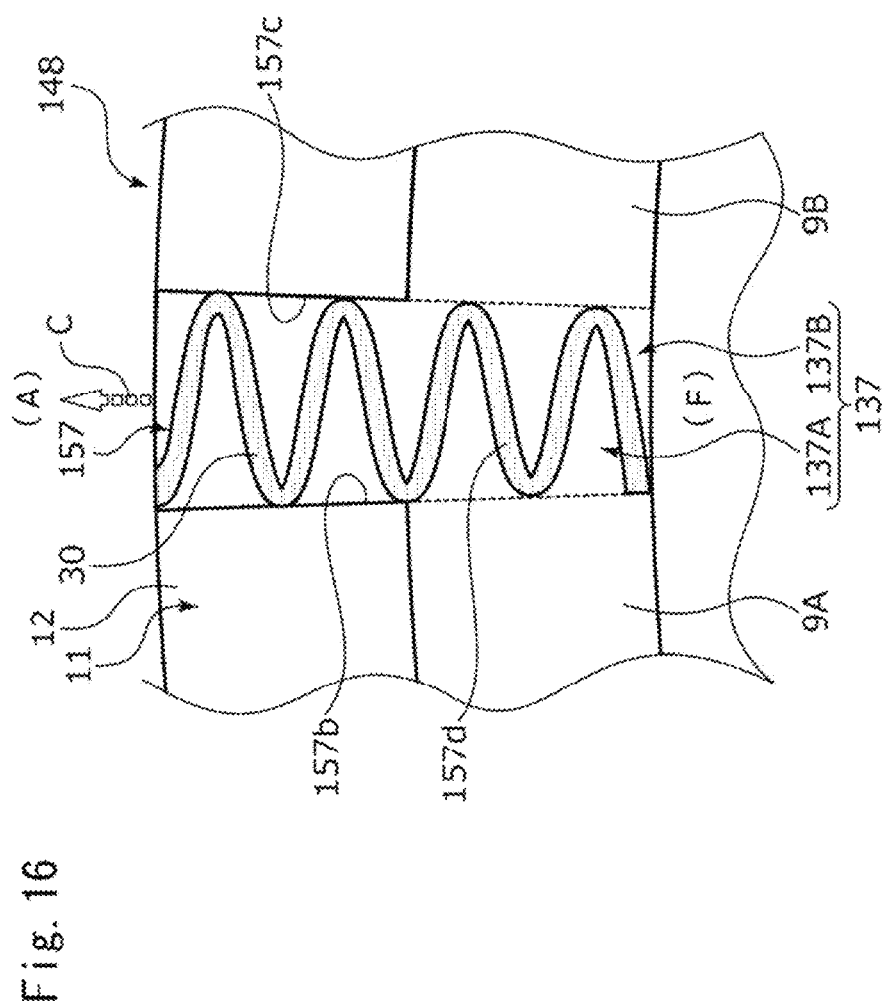
FIG. 16 is a main part enlarged view of a sliding surface of a stationary seal ring as a sliding component according to a tenth embodiment of the present invention.

Next, a stationary seal ring as a sliding component according to a tenth embodiment of the present invention will be described with reference to FIG. 16. Incidentally, the description of configurations which are the same as and duplicated from those in the second embodiment will be omitted. In addition, here, only the form of a dynamic pressure generating mechanism 148 will be described.

The dynamic pressure generating mechanism 148 includes the Rayleigh step 9A, the reverse Rayleigh step 9B, a liquid guide groove portion 157, and a trap portion 137. The trap portion 137 includes trap wall portions 137A and 137B including a plurality of protrusions that protrude from a downstream wall surface 157b and an upstream wall surface 157c of the liquid guide groove portion 157 to the upstream side and the downstream side facing each other. Incidentally, broken lines in the drawing illustrate imaginary wall surfaces.

The trap wall portions 137A and 137B are disposed to alternate with each other with a predetermined interval therebetween, and a meandering groove 30 which meanders continuously while being bent to a downstream wall surface 157b side and an upstream wall surface 157c side is formed between the trap wall portions 137A and 137B. The trap wall portions 137A and 137B are formed such that end surfaces thereof facing the sliding surface 21 of the rotating seal ring 20 are located at a depth position of 10 μm which is deeper than that of the Rayleigh step 9A and the reverse Rayleigh step 9B. The trap wall portions 137A and 137B are continuous from the end surfaces thereof to a bottom surface 157d of the liquid guide groove portion 157 in the axial direction, the end surfaces facing the sliding surface 21 of the rotating seal ring 20. Incidentally, the depth dimension where the end surfaces of the trap wall portions 137A and 137B are located, the end surfaces facing the sliding surface 21 of the rotating seal ring 20, may be, for example, the same dimension as that of the Rayleigh step 9A and the reverse Rayleigh step 9B, a smaller dimension than that of the Rayleigh step 9A and the reverse Rayleigh step 9B, or a larger dimension, which is not limited to 10 μm, than that of the Rayleigh step 9A and the reverse Rayleigh step 9B.

Accordingly, since the meandering groove 30 of the trap portion 137 makes it difficult for the sealed liquid F to linearly move from the sealed liquid F side toward the atmosphere side, the function of holding the sealed liquid F in the liquid guide groove portion 157 can be improved.

In addition, in the trap portion 137, since the width of the meandering groove 30 is narrowed by the trap wall portions 137A and 137B, surface tension is generated in the sealed liquid F existing in the meandering groove 30, and the surface tension counters the centrifugal force applied to the sealed liquid F, so that as illustrated with a halftone dot portion, the holding ability to hold the sealed liquid F on the inner diameter side of the trap portion 137 is increased.

Eleventh Embodiment

Next, a stationary seal ring as a sliding component according to an eleventh embodiment of the present invention will be described with reference to FIG. 17. Incidentally, the description of configurations which are the same as and duplicated from those in the second embodiment will be omitted. In addition, here, only the form of a dynamic pressure generating mechanism 149 will be described.

The dynamic pressure generating mechanism 149 includes a Rayleigh step 94A, a reverse Rayleigh step 94B, a liquid guide groove portion 158, and a trap portion 138. The trap portion 138 includes a trap wall portions 138A and 138B in which protrusions 19 which have a right-angled triangular shape and are inclined from a downstream wall surface 158b and an upstream wall surface 158c to a central portion side in the radial direction of the liquid guide groove portion 158 from the outer diameter side toward the inner diameter side are continuously disposed in the radial direction. Incidentally, in the protrusion 19, an end surface inclined to the central portion side in the radial direction of the liquid guide groove portion 158 from the outer diameter side toward the inner diameter side is an outer diameter side end surface 19a, and an end surface extending from an end portion of the outer diameter side end surface 19a toward the downstream wall surface 158b or the upstream wall surface 158c is an inner diameter side end surface 19b, the end portion being located on the central portion side in the radial direction of the liquid guide groove portion 158.

The trap wall portions 138A and 138B are axisymmetrically disposed with respect to a center line in the radial direction of the liquid guide groove portion 158 with a predetermined interval therebetween. In addition, in the trap wall portion 138A, an end surface of the trap wall portion 138A forms the same plane as that of the land 12, the end surface facing the sliding surface 21 of the rotating seal ring 20.

Accordingly, when the sealed liquid F flows into the liquid guide groove portion 158 from the atmosphere side toward the sealed liquid F side, the outer diameter side end surface 19a of the protrusion 19 functions as a guide surface that guides the sealed liquid F to a Rayleigh step 94A side, and therefore, the trap portion 138 is unlikely to prevent the sealed liquid F from being recovered into the Rayleigh step 94A.

In addition, when the sealed liquid F flows into the liquid guide groove portion 158 from the sealed liquid F side toward the atmosphere side, as illustrated with a halftone dot portion, in the trap portion 138, the inner diameter side end surface 19b of the protrusion 19 can trap the sealed liquid F. Therefore, the function of holding the sealed liquid F in the liquid guide groove portion 158 can be improved.

The embodiments of the present invention have been described above with reference to the drawings; however, the specific configuration is not limited to the embodiments, and the present invention also includes changes or additions that are made without departing from the concept of the present invention.

For example, in the embodiments, as an example of the sliding component, the mechanical seal for a general industrial machine has been described, but the present invention may be applied to other mechanical seals for an automobile, a water pump, and the like. In addition, the present invention is not limited to the mechanical seal, and may be applied to a sliding component such as a slide bearing other than the mechanical seal.

In addition, in the embodiments, an example where the dynamic pressure generating mechanism is provided only in the stationary seal ring has been described; however, the dynamic pressure generating mechanism may be provided only in the rotating seal ring 20, or may be provided in both the stationary seal ring and the rotating seal ring.

In addition, in the embodiments, a mode in which the sliding component is provided with the plurality of dynamic pressure generating mechanisms having the same shape has been provided as an example; however, a plurality of dynamic pressure generating mechanisms having different shapes may be provided. In addition, the interval between the dynamic pressure generating mechanism, the number of the dynamic pressure generating mechanisms, or the like can be appropriately changed.

In addition, the trap portion may be configured such that the trap portions of the first embodiment and the fourth to eleventh embodiments are appropriately combined, and the configuration of the trap portion may be appropriately changed as long as the configuration can suppress leakage to the low-pressure side.

In addition, in the embodiments, the outside mechanical seal which seals the sealed liquid F tending to leak from the inner diameter side of the sliding surfaces toward the outer diameter side has been described; however, the present invention may be applied to an inside mechanical seal that seals the sealed liquid F tending to leak from the outer diameter side of the sliding surfaces toward the inner diameter side.

In addition, the description has been given based on the premise that the sealed fluid side is a high-pressure side and the leakage side is a low-pressure side; however, the sealed fluid side may be a low-pressure side and the leakage side may be a high-pressure side, or the sealed fluid side and the leakage side may have substantially the same pressure.

REFERENCE SIGNS LIST

9A Rayleigh step (shallow groove portion)
9B Reverse Rayleigh step (shallow groove portion)
10 Stationary seal ring (sliding component)
11 Sliding surface
13 Trap portion
13A, 13B Trap piece
13a Low-pressure side wall surface (guide surface)
14 Dynamic pressure generating mechanism
15 Liquid guide groove portion (Deep groove portion)
15a Opening portion
15b Downstream wall surface (inner surface)
15c Upstream wall surface (inner surface)
15d Bottom surface (inner surface)
19a Outer diameter side end surface (guide surface)
20 Rotating seal ring (sliding component)
21 Sliding surface
30 Meandering groove
91A to 94A Rayleigh step (shallow groove portion)
91B to 94B Reverse Rayleigh step (shallow groove portion)
131 to 138 Trap portion
141 to 149 Dynamic pressure generating mechanism
151 to 158 Liquid guide groove portion (deep groove portion)

The invention claimed is:

1. A sliding component that has an annular shape and is disposed in a place where relative rotation is performed in a rotary machine, comprising a plurality of dynamic pressure generating mechanisms,
wherein the plurality of dynamic pressure generating mechanisms are provided in a sliding surface of the sliding component, each of the dynamic pressure generating mechanisms including a deep groove portion that communicates with an outer diameter side or an inner diameter side, and at least one shallow groove portion that communicates with the deep groove portion and extends in a circumferential direction, the shallow groove portion is shallower than the deep groove portion,
the deep groove portion is provided with a trap portion that suppresses leakage of a sealed fluid in the deep groove portion,
the deep groove portion is defined by a pair of side wall surfaces opposed to each other in the circumferential direction, and
the trap portion has at least one protruded trap piece which is formed in a quadrilateral shape in a plan view and protruded in a radial direction from one of the side wall surfaces of the deep groove portion.

2. The sliding component according to claim 1, wherein the at least one protruded trap piece includes a pair of side wall surfaces parallel to the circumferential direction.

3. The sliding component according to claim 2, wherein the at least one protruded trap piece further includes an end wall surface which is continuous to and between the side wall surfaces of the protruded trap piece, and the end wall surface of the protruded trap piece is parallel to the radial direction.

4. The sliding component according to claim 1, wherein the at least one trap portion further has at least one isolated trap piece which is inside the deep groove portion and isolated from the protruded trap piece.

5. The sliding component according to claim 1, wherein the at least one protruded trap pieces are arranged on both sides of the deep groove in the circumferential direction, and
the isolated trap pieces are shifted from the protruded trap pieces in the radial direction.

6. The sliding component according to claim 5, wherein the at least one protruded trap pieces and the isolated trap pieces are symmetrically disposed with respect to an imaginary center line of the deep groove portion parallel to the radial direction in a plan view.

7. The sliding component according to claim 1, wherein the deep groove portion communicates with the outer diameter side.

8. The sliding component according to claim 1, wherein the deep groove portion communicates with a leakage side.

9. A sliding component that has an annular shape and is disposed in a place where relative rotation is performed in a rotary machine, comprising a plurality of dynamic pressure generating mechanisms,
wherein the plurality of dynamic pressure generating mechanisms are provided in a sliding surface of the sliding component, each of the dynamic pressure generating mechanisms including a deep groove portion and at least one shallow groove portion that extends in a circumferential direction, the shallow groove portion is shallower than the deep groove portion,
the deep groove portion is provided with a trap portion that suppresses leakage of a sealed fluid in the deep groove portion,
the deep groove portion has a wide groove part and a narrow groove part,
the wide groove part of the deep groove portion is wider than the narrow groove part in the circumferential direction,
the wide groove part of the deep groove portion communicates with the shallow groove portion,
the narrow groove part of the deep groove portion communicates with an outer diameter side or an inner diameter side of the sliding component, the wide groove part of the deep groove portion is defined by a pair of side wall surfaces opposed to each other in the circumferential direction, part of the pair of side wall surfaces extends from a bottom surface of the wide groove part to the sliding surface, and the trap portion is formed by a land portion which defines the narrow groove part of the deep groove portion.

10. The sliding component according to claim 9, wherein the pair of side wall surfaces defining the wide groove part of the deep groove portion is a pair of first side wall surfaces the narrow groove part of the deep groove portion is defined by a pair of second side wall surfaces opposed to each other in the circumferential direction, the deep groove portion is partially defined by a pair of third side wall surfaces connecting the first side wall surfaces to the second side wall surfaces.

11. The sliding component according to claim 10, wherein the first side wall surfaces and the second side wall surfaces are parallel to a radial direction, and the third side wall surfaces are parallel to the circumferential direction.

12. The sliding component according to claim 9, wherein the deep groove portion communicates with the outer diameter side.

13. The sliding component according to claim 9, wherein the deep groove portion communicates with a leakage side.

14. A sliding component that has an annular shape and is disposed in a place where relative rotation is performed in a rotary machine, comprising a plurality of dynamic pressure generating mechanisms, wherein the plurality of dynamic pressure generating mechanisms are provided in a sliding surface of the sliding component, each of the dynamic pressure generating mechanisms including a deep groove portion that communicates with an outer diameter side or an inner diameter side, and at least one shallow groove portion that communicates with the deep groove portion and extends in a circumferential direction, the shallow groove portion is shallower than the deep groove portion, the deep groove portion is provided with a trap portion that suppresses leakage of a sealed fluid in the deep groove portion, the trap portion has at least four trap pieces which are continuously formed in a radial direction, each of the trap pieces is formed in a triangle shape in a plan view, each of the trap pieces is defined by a first side wall surface which extends from a side wall surface of the deep groove portion toward a center of circumferential width of the deep groove portion, a second side wall surface which is disposed on a leakage side with respect to the first side wall surface, and a connecting surface which extends in parallel to the sliding surface and connects the first side wall surface and the second side wall surface, and at least part of the connecting surface is flush with a bottom surface of the shallow groove portion, wherein at least two of the at least four trap pieces are disposed facing one another, and at least two other of the at least four trap pieces are radially spaced apart from one another.

15. The sliding component according to claim 14, wherein the first side wall surface of each of the trap pieces is parallel to the circumferential direction, the second side wall surface of each of the trap pieces is inclined with respect to the circumferential direction, and the connecting surface partially defining each of the trap pieces is formed in a triangle shape.

16. The sliding component according to claim 14, wherein the trap pieces are arranged throughout from the outer diameter side of the deep groove portion and to the inner diameter side of the deep groove portion.

17. The sliding component according to claim 14, wherein the trap pieces are arranged both sides of the deep groove portion in the circumferential direction.

18. The sliding component according to claim 17, wherein the trap pieces are symmetrically disposed with respect to an imaginary center line of the deep groove portion parallel to the radial direction in a plan view.

19. The sliding component according to claim 14, wherein the deep groove portion communicates with the outer diameter side.

20. The sliding component according to claim 14, wherein the deep groove portion communicates with a leakage side.

\* \* \* \* \*